(12) United States Patent  
Bonner

(10) Patent No.: US 8,694,008 B2
(45) Date of Patent: Apr. 8, 2014

(54) MULTI-MODE HANDSET SERVICES

(75) Inventor: Thomas W. Bonner, Smyrna, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 837 days.

(21) Appl. No.: 11/154,775

(22) Filed: Jun. 16, 2005

(65) Prior Publication Data

US 2006/0286984 A1 Dec. 21, 2006

(51) Int. Cl.
H04W 40/00 (2009.01)

(52) U.S. Cl.
USPC ..... 455/445; 455/432.1; 455/434; 455/456.1; 455/440

(58) Field of Classification Search
USPC .................. 455/445, 440, 432.1, 434, 456.1
See application file for complete search history.

(56) References Cited

U.S. PATENT DOCUMENTS

| | | | |
|---|---|---|---|
| 5,353,331 A | 10/1994 | Emery et al. | |
| 5,715,296 A | 2/1998 | Schornach et al. | |
| 6,002,937 A | 12/1999 | Young et al. | |
| 6,044,267 A | 3/2000 | Foladare et al. | |
| 6,259,782 B1 | 7/2001 | Gallant | |
| 6,327,268 B1 | 12/2001 | Sipila | |
| 6,771,953 B1 | 8/2004 | Chow et al. | |
| 6,965,914 B2 | 11/2005 | Dowling | |
| 2003/0022660 A1 | 1/2003 | Payne et al. | |
| 2004/0235455 A1 | 11/2004 | Jiang | |
| 2004/0235500 A1* | 11/2004 | Dombkowski et al. | 455/461 |
| 2004/0242230 A1* | 12/2004 | Rue | 455/433 |
| 2004/0264410 A1 | 12/2004 | Sagi et al. | |
| 2004/0266426 A1 | 12/2004 | Marsh et al. | |
| 2005/0009525 A1* | 1/2005 | Evslin | 455/445 |
| 2005/0047435 A1 | 3/2005 | Segal et al. | |
| 2005/0186960 A1* | 8/2005 | Jiang | 455/435.1 |
| 2005/0255879 A1* | 11/2005 | Shi et al. | 455/552.1 |
| 2006/0003781 A1* | 1/2006 | Jin et al. | 455/509 |
| 2006/0025138 A1* | 2/2006 | Kotzin | 455/445 |
| 2006/0025141 A1* | 2/2006 | Marsh et al. | 455/445 |
| 2006/0068794 A1* | 3/2006 | Caspi et al. | 455/445 |
| 2006/0088009 A1* | 4/2006 | Gibbs et al. | 370/338 |

FOREIGN PATENT DOCUMENTS

WO 2004082219 A2 9/2004

OTHER PUBLICATIONS

International Search Report and written opinion for PCT Application No. PCT/US06/19837 dated Jun. 13, 2008, 11 pgs.
European Communication for European Application No. 06 760 286.2-1525. Oct. 1, 2010, 4 pages.

(Continued)

Primary Examiner — Olumide T Aljibade Akonai
Assistant Examiner — Shantell L Heiber
(74) Attorney, Agent, or Firm — Amin, Turocy & Watson, LLP

(57) ABSTRACT

Delivery of dual-mode GSM/WiFi voice and data services to a consumer with support for transparent network registrations and handovers between GSM and WiFi networks. Aspects include transparently and wirelessly automating call redirection procedures of calls and data (e.g., SMS messages) to legacy telephone devices, to GSM handsets via broadband, and to VoIP devices via broadband. An indoor network is treated as a pseudo visitor PLMN (VPLMN) by the home PLMN (HPLMN) which does not require GSM radio coverage in an indoor network. This innovation provides a means for automating a process of redirecting a subscriber's calls from the GSM network to the subscriber's home network, and can utilize a Bluetooth access point to provide a beacon signal for triggering redirection.

18 Claims, 20 Drawing Sheets

(56) References Cited

OTHER PUBLICATIONS

European Supplementary Search Report for EP Application No. 06760286.2-1525/1894426, dated Jan. 28, 2011, 9 pages.

Banerjee N, et al., "SIP-Based Mobility Architecture for Next Generation Wireless Networks". Pervasive Computing and Communications, 2005. Percom 2005. Third IEEE International Conference on Kauai Island, HI, USA Mar. 8-12, 2005, Piscataway, NJ, USA, IEEE, Mar. 8, 2005, pp. 181-190, XP010779652; DOI:10.1109/PERCOM.2005.40; ISBN: 978-0-7695-2299-9. Last accessed on Feb. 16, 2011, 10 pages.

Banerjee N., et al., "Mobility support in wireless internet", IEEE Personal Communications, IEEE Communications Society, US, vol. 10, No. 5, Oct. 1, 2003, pp. 54-61, XP011102955, ISSN: 1070-9916, DOI: DOI:10.1109/MWC.2003.1241101. Last accessed on Feb. 16, 2011, 4 pages.

Ashutosh Dutta, et al., "Experimental Analysis of Multi Interface Mobility Management with SIP and MIP". Wireless Networks, Communications and Mobile Computing, 2005 International Conference on Maui, HI, USA Jun. 13-16, 2005, Piscataway, NJ, USA, IEEE, vol. 2, Jun. 13, 2005, pp. 1301-1306, XP010888148, DOI: DOI:10.1109/Wirles.2005.1549600; ISBN:978-0-7803-9305-9. Last accessed on Feb. 16, 2011, 6 pages.

Schulzrinne H, et al., "Application-Layer Mobility Using SIP". Mobile Computing and Communications Review, ACM, New York, NY, US, vol. 4, No. 3, Jul. 1, 2000, pp. 47-57, XP000992003, ISSN: 1091-1669. Last accessed on Feb. 16, 2011, 11 pages.

Office Action for JP Application No. 2008-516886, dated May 11, 2012, 4 pages.

Canadian Office Action dated Jun. 3, 2013 for Canadian Application No. 2,612,372, 3 pages.

\* cited by examiner

MULTI-MODE HANDSET SERVICES

TECHNICAL FIELD

This invention relates to a wireless telecommunications system, and more specifically, to the delivery of dual-mode WiFi/GSM voice and data services to a consumer.

BACKGROUND

In recent years, the vast majority of the industrialized world has become accessible via the public switched telephone network (PSTN). Most commonly, this accessibility has been implemented through conventional telephone systems. A conventional telephone system may be considered to be and is hereinafter included in the general category of wire-line systems, that is, telecommunications systems that transmit communications over lines such as copper, cable, and/or fiber optic lines. Thus, a unit that operates in a wire-line system can be referred to as a wire-line unit. For example, corded and cordless telephones are common examples of wire-line units.

Wireless network operators and wire-line affiliates are searching for ways to bundle their wireless and wire-line services under a single pricing plan. One scenario would allow the subscriber to use the same "bucket" of wireless minutes on his/her residential wire-line phone.

The popularity and widespread acceptance of wireless communication systems have brought about the development of systems that work as an adjunct to wireless communication systems and with the PSTN. An example of an adjunct to wireless communication systems is a fixed wireless loop (FWL) system. An FWL system allows a user to effectively convert certain conventional wire-line telephones into extensions of the user's wireless telephone or unit. In particular, the FWL system usually includes a cell phone physically connected to one or more conventional telephones within a discrete location, such as a home or office. The FWL system allows the user to make use of the wireless communications system through the connected conventional telephones. These extensions to the cell phone can provide the user with certain advantages. Yet, these FWL systems do not provide the user with access to the PSTN independently of the wireless communication system. Such lack of direct access to the PSTN can be critical in the event that one of the wireless communication links, from and including the cell phone to the wireless communication system, is not functioning properly.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed innovative architecture addresses shortcomings of the prior solutions mentioned above by providing to a user, who has access to the PSTN (public switched telephone network) and also subscribes to a wireless communications service, a mechanism that transparently automates activation and deactivation of redirecting mobile telephone calls (e.g., mobile terminated and mobile originated) from a home PLMN (public land mobile network) to the subscriber's residence (or other indoor network) over the POTS (plain old telephone system) and/or broadband connections. Automatic roaming registrations are also performed between IMS (IP multimedia systems) platforms and PLMNs, and automatic unlicensed network (e.g., WiFi) to cellular network (e.g., GSM-global system for mobile communications) call and data handovers are performed transparently to the subscriber.

Accordingly, there is provided a system that employs a trigger component that receives as an input, a signal which causes the trigger component to output a trigger signal to a redirection component. The redirection component processes a call between a cellular network (e.g., GSM) and a home network. That is, as a user, who is conversing during an active telephone call, moves into a building (e.g., a home or business), the redirection component receives a trigger signal from the trigger component and facilitates redirecting the call from a cellular communications system (e.g., GSM) to a VoIP (voice over IP) system in the building. Conversely, as the user converses and moves from the building to the outside, the redirection component receives a trigger signal from the trigger component and facilitates redirecting the call from the inside VoIP network to the cellular communications system. This occurs transparently to the user.

In operation, as the subscriber moves the mobile handset into the residence, for example, a client of the handset detects a signal of a WLAN access point. Once detected by the handset, the handset SIP (session initiation protocol) client initiates a registration procedure over a broadband connection with a WLAN VoIP service located at an application service provider (ASP). However, this connection can also be made over the POTS network to the ASP, if the broadband connection is down or does not exist. The handset SIP client initiates registration with a VoIP application server through the IMS. If the handset does not employ a SIP client, but incorporates an unlicensed wireless technology (e.g., Bluetooth), a cordless telephony profile can be employed such that the home access point becomes a gateway to the VoIP network. Thus, the trigger is the handset making contact with the access point, which triggers the access point to initiate the registration procedure with the SIP VoIP network. This further triggers voice call redirection over the broadband connection. Thus, detection can occur with the mobile handset, or the access point, or both the handset and the access point.

When the handset moves outside or outside the range of the access point, and gains signal communications with the cellular network, the cellular network (e.g., GSM) initiates a registration process. This triggers the cellular network roaming procedures, and a location update is performed with the home network. The home network sends a location cancellation MAP (mobile application part) signal to the visited network, and the visited network then knows that the subscriber is no longer a member of the visited network.

The innovation, in one exemplary instance, includes delivery of dual-mode GSM/WiFi voice and data services to the consumer with support for transparent network registrations and handovers between GSM and WiFi. Aspects include transparently and wirelessly automating call redirection procedures. An IMS system based on SIP signaling is employed that enables redirection to work with standardized VoIP services. Moreover, the innovation supports the redirection of calls and data to legacy telephone devices, to GSM handsets via broadband, and to VoIP devices via broadband. An indoor network is treated as a pseudo visitor PLMN (VPLMN) by the home PLMN (HPLMN). This innovation does not require GSM radio coverage in the indoor network.

This innovation provides a means for automating a process of redirecting subscriber's calls from the GSM network to the subscriber's home network. It can utilize an unlicensed spectrum (e.g., Bluetooth) and/or WLAN access point to provide a beacon signal for triggering. The innovation provides a means of redirecting a VoIP call originally addressed to a GSM phone number to the CFU (call forwarding unconditional) number without routing the call through a GSM gateway MSC (mobile switching center). A new set of network elements based on SIP (session initiation protocol) signaling is introduced that enables this concept to work with VoIP services.

The innovation provides a mechanism to originate and terminate calls in a residence using any one of a POTS phone, mobile device operating in a cordless telephone mode, and wired VoIP handsets. In each of these, the originating and terminating calls can be controlled and directed by an indoor access point, which can operate in an active or passive mode. The subscriber's mobile number is used as the main number, meaning all mobile terminated calls are first routed to the subscriber's HPLMN and then forwarded to the subscriber's residence across a broadband connection.

Another aspect of the invention provides a means for signaling and bearer traffic to be routed to and from the subscriber's home via POTS and/or broadband connections.

Yet another aspect of the invention provides a means to automatically detect the presence or absence of the mobile device in the residence. An indoor access point can contain at least a SIP client, a GSM inter-working function (IWF), a NAC (network access controller) function, an indoor network radio transceiver, a mechanical switch, and a GSM receiver. The SIP client will enable the indoor access point to support SIP protocols and register the subscriber with a SIP registrar server. The GSM IWF enables the indoor access point to support GSM authentication, access control and voice codecs. It is needed when this functionality does not reside on the GSM handset. The mechanical switch enables the IAP to manually control signaling and redirection when the IAP is incapable of automatically detecting the GSM handset. The handset device described herein is provided with a GSM receiver that detects the presence of a GSM network and triggers activation of the WiFi radio operating in the handset. The trigger method may include messaging via the broadband/PSTN connection and the GSM/GPRS network.

Additionally, disclosed herein is a mechanism of transparently controlling the GSM registration procedure in the HPLMN without any modification to the HPLMN. A signaling method to redirect mobile terminated calls is MAP Location Update messaging.

In another instance, there is provided transparent control of the GSM CFU procedure in the HPLMN without modification to the HPLMN, using MAP signaling.

In another aspect, there is disclosed redirection of VoIP calls originally addressed to the mobile device number to the CFU number or temporary number without routing the call through the GSM gateway MSC, also referred to as optimal routing.

In yet another aspect, a mechanism is provided that automatically redirects calls from the HPLMN to the indoor network without having the mobile handset powered on and continuously in wireless contact with the indoor access point.

In still another aspect, the innovation provides management of voice call handovers between packet-switched networks and circuit-switched networks.

In another aspect, there is disclosed establishment of a circuit-switched bearer for a mobile device using SIP signaling through a WiFi network.

The systems and methods described herein disclose automatically powering on a handset WiFi transceiver and starting the handset WiFi registration procedure.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
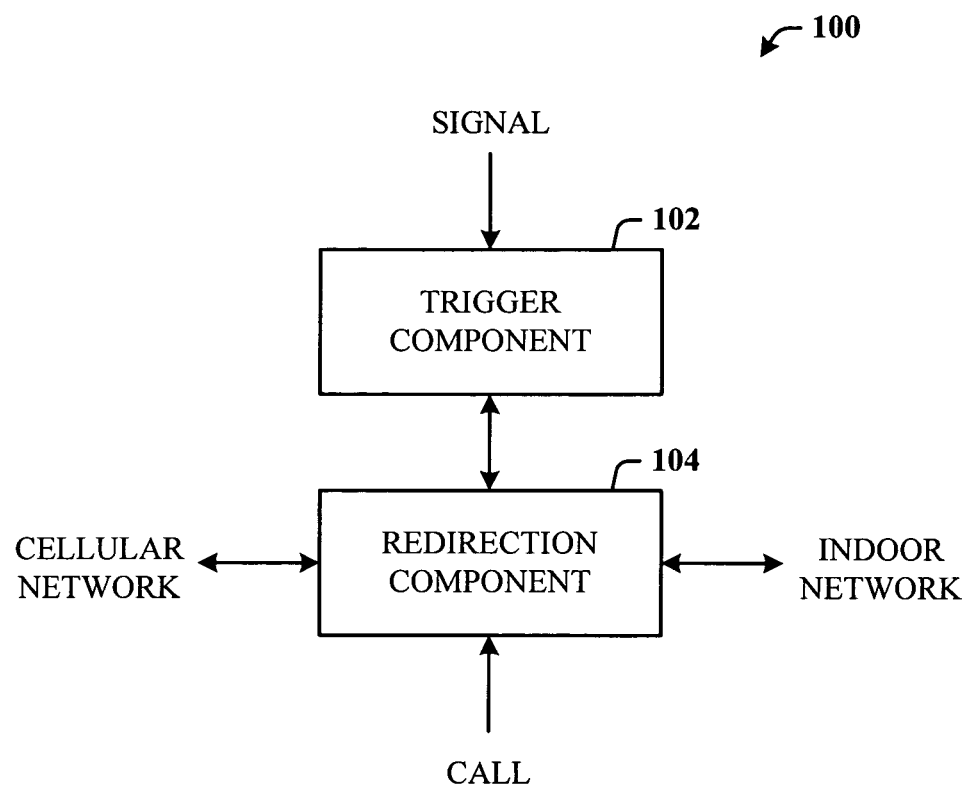
FIG. 1 illustrates a system that employs call redirection in accordance with an innovative aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Although applicable to any existing or yet to be developed wireless telecommunications network, the aspects of the present invention will be described with reference to the GSM (global system for mobile communications) air interface that uses GPRS (General Packet Radio Service) as an enabling bearer. Examples of other suitable wireless and radio frequency data transmission systems include networks utilizing, Time Division Multiple Access (TDMA), Frequency Division Multiple Access (FDMA), Wideband Code Division Multiple Access (WCDMA), Orthogonal Frequency Division Multiplexing (OFDM), and various other 2.5 and 3G (third generation) and above wireless communications systems. Examples of other suitable enabling bearers include Universal Mobile Telecommunications System (UMTS), Enhanced Data rates for Global Evolution (EDGE), High Speed Downlink Packet Access (HSDPA), and similar communications protocols.

The subject innovation provides a number of mobility management features. Firstly, the innovation provides for the automatic and transparent (to the user) redirecting of voice calls between a cellular network and a separate network that services a building (e.g., a residence), using a broadband connection as the backhaul. Secondly, the innovation discloses handover of the voice call between a wireless LAN (WLAN) and the cellular network.

Described herein, in one exemplary implementation of network call redirection, is network detection in the form of automatic detection of GSM and WLAN networks. Network selection provides automatic and transparent transition between the GSM and WLAN networks. Subscriber registration utilizes a GSM location update procedure that facilitates access to IMS (IP multimedia subsystem) services utilizing WiFi. Call redirection facilitates redirecting voice services from/to a GSM network to/from the WLAN network. Persistent data sessions are provided when transitioning between the GSM and WLAN networks. Voice call handovers include the transition of active calls between the GSM and WLAN networks. SMS (short message service) data services redirection forwards SMS messages, for example, from/to the home SMSC to/from the SGW (signaling gateway) SMS message handler.

It is within contemplation of the subject innovation that other cellular network technologies (e.g., UMTS, CDMA, . . .) can be employed, and that other data services (e.g., MMS) redirection can also be employed.

In operation, as the subscriber moves the mobile handset into the residence, for example, a client of the handset detects a signal of a WLAN access point. Once detected by the handset, the handset SIP (session initiation protocol) client initiates a registration procedure over a broadband connection with a WLAN VoIP service located at an application service provider (ASP). However, this connection can also be made over the POTS network to the ASP, if the broadband connection is down or does not exist. The handset SIP client initiates registration with an IMS VoIP application server. If the handset does not employ a SIP client, but incorporates an unlicensed wireless technology (e.g., Bluetooth), a cordless telephony profile can be employed such that the home access point becomes a gateway to the VoIP network. Thus, the trigger is the handset making contact with the access point, which triggers the access point to initiate the registration procedure with the SIP VoIP network. This further triggers voice call redirection over the broadband connection. Thus, detection can occur with the mobile handset, or the access point, or both the handset and the access point.

When the handset moves outside or outside the range of the access point, and gains signal communications with the cellular network, the cellular network (e.g., GSM) initiates a registration process. This triggers the cellular network roaming procedures, and a location update is performed with the home network. The home network sends a location cancellation MAP (mobile application part) signal to the visited network, and the visited network then knows that the subscriber is no longer a member of the visited network.

Referring initially to the drawings, FIG. 1 illustrates a system 100 that employs call redirection in accordance with an innovative aspect. The system 100 can include a trigger component 102 that receives as an input, a signal which causes the trigger component 102 to output a trigger signal to a redirection component 104. The redirection component 104 processes a call between a cellular network and a home network. That is, as a user, who is conversing during an active telephone call, moves into a building (e.g., a home or business), the redirection component 104 receives a trigger signal from the trigger component 102 and facilitates redirecting the call from a cellular communications system (e.g., GSM) to a VoIP (voice over IP) system in the building. Conversely, as the user converses, and moves from the building to the outside, the redirection component 104 receives a trigger signal from the trigger component 102 and facilitates redirecting the call from the inside VoIP network to the cellular communications system (e.g., GSM). This occurs transparently to the user.

In one example, the disclosed innovation can transparently automate the activation and deactivation of redirecting mobile terminated calls from the home PLMN (public land mobile network) or HPLMN to the subscriber residence over the POTS (Plain Old Telephone Service) and/or broadband connections; roaming registrations between IMS platforms and PLMNs; and WiFi-to-GSM voice handovers.

Figure 2:
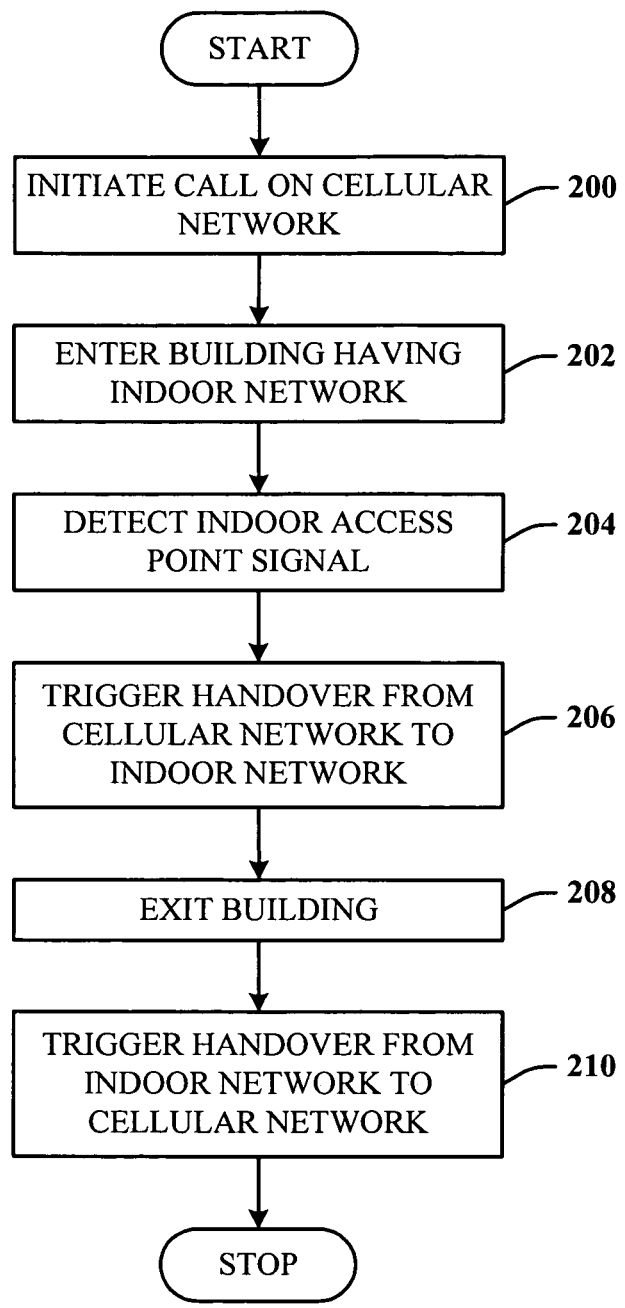
FIG. 2 illustrates a methodology of redirecting a call according to an innovative aspect.

FIG. 2 illustrates a methodology of redirecting a call according to an innovative aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a call is initiated on a cellular network while the user is outside of a building. At 202, the caller enters the building while on the call. At 204, the user handset is detected as being indoors via an indoor access point (IAP) signal, for example. At 206, handover from the cellular network to the home network is triggered, and occurs transparently to the user. At 208, the user exists the building. At 210, handover is triggered from the home network back to the cellular network. Again, this occurs transparently to the user.

Figure 3:
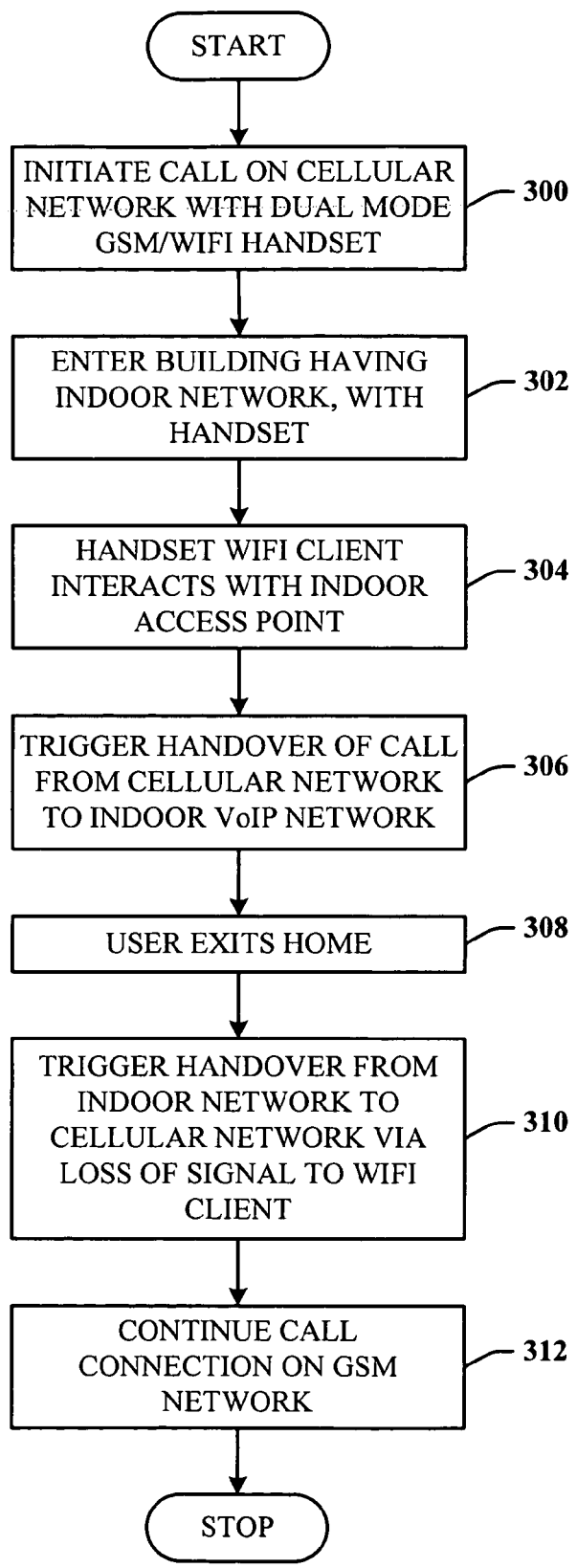
FIG. 3 illustrates a methodology of redirecting a call when utilizing a GSM/WiFi configuration.

Referring now to FIG. 3, there is illustrated a methodology of redirecting a call when utilizing a GSM/WiFi configuration. At 300, a call is initiated on the cellular network using a dual mode GSM/WiFi handset. At 302, the user enters a building having an indoor VoIP network, while on the call. At 304, a WiFi client on the handset interacts with an IAP. At 306, handover from the GSM network to the indoor VoIP network is triggered based in part on a beacon of the IAP. At 308, the user exits the home. At 310, handover from the home network to the GSM cellular network is triggered due to a loss of signal to the handset WiFi client from the IAP. At 312, the call is maintained on the GSM network automatically and transparently to the user.

Figure 4:
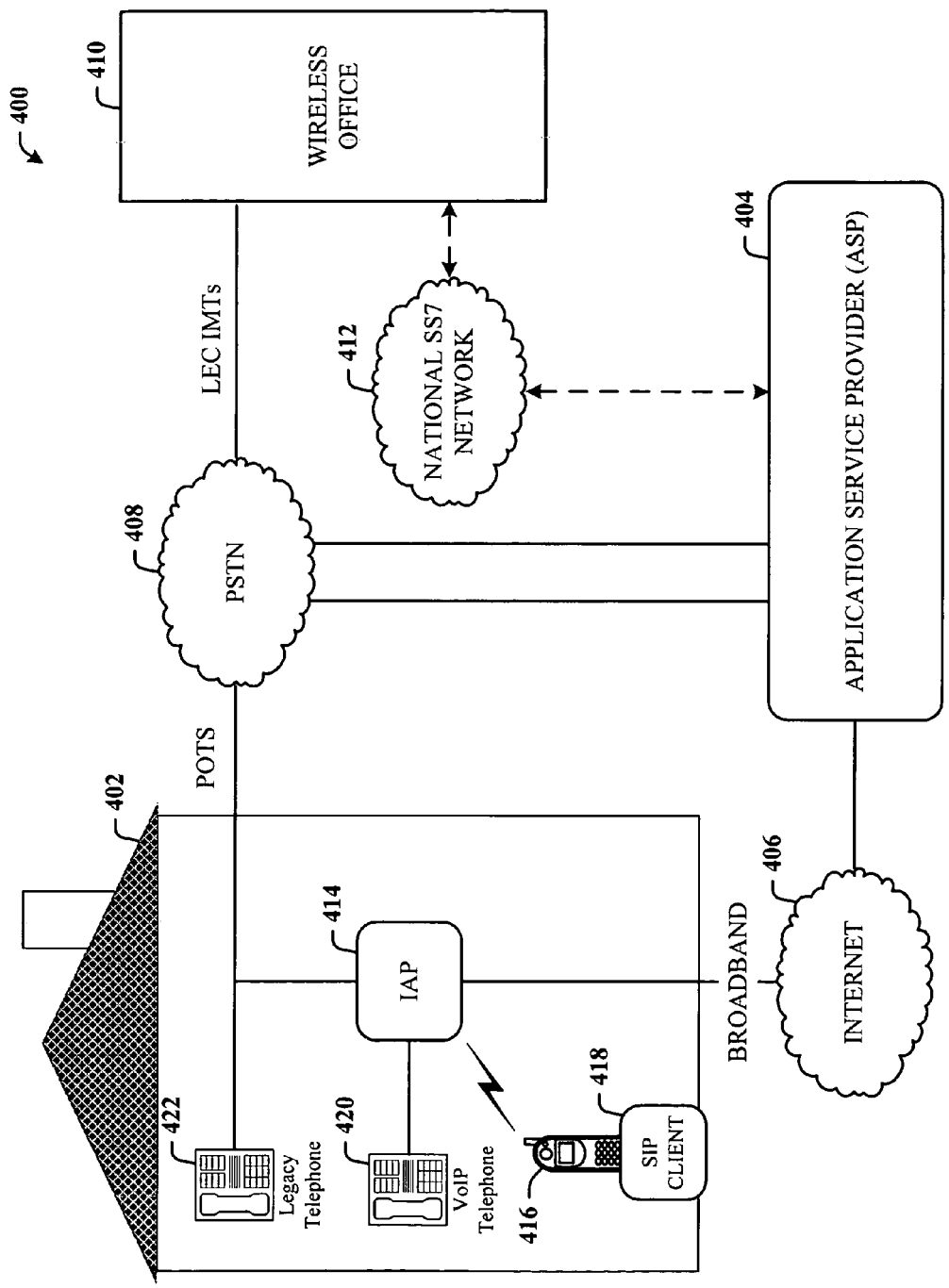
FIG. 4 illustrates a dual-mode network that facilitates call redirection in accordance with another aspect of the innovation.

FIG. 4 illustrates a dual-mode network 400 that facilitates call redirection in accordance with another aspect of the innovation. The dual mode network 400 can include a residential location 402 that connects to an application service provider (ASP) 404 via a broadband connection over a global communications networks 406 (e.g., the Internet), via a PSTN network 408, and a wireless office 410 and an SS7 (Signaling System 7) network 412. The residential location 402 depicts an IAP 414, a multi-mode handset 416 (e.g., GSM/WiFi) that includes a SIP (session initiation protocol) client 418, a VoIP telephone 420 and a legacy (e.g., POTS) phone 422.

The GSM handset 416, capable of dual-mode GSM/WiFi operation and including the SIP-enabled client 418, is optionally employed for registration signaling and to originate and terminate calls. The handset 416 may not include the SIP (or other) software client 418 that enables the device to control signaling and bearer traffic. In this case, the IAP 414 can control the registration signaling, and the GSM handset 416 is not capable of sending or receiving through the IAP 414. The IAP 414 can operate in a passive or active mode. In an active mode, the IAP 414 can be equipped with the following functionality: a SIP client; GSM IWF (inter-working function); NAC (network access controller) function; an indoor network radio transceiver; a mechanical switch; and a GSM receiver. The GSM IWF/NAC component enables the IAP 414 to support GSM authentication, access control, and voice codecs. It is only needed when this functionality does not reside in the GSM handset. The NAC function includes 802.1x and a RADIUS client that supports EAP-SIM and EAP-AKA (authentication and key agreement). The mechanical switch functions to enable the IAP 414 to manually control signaling and redirection when the IAP 414 is incapable of automatically detecting the handset 426. The GSM transceiver facilitates detecting the presence of handset 416 operating in the GSM mode and triggers the activation of the WiFi radio in the handset 416. The trigger method may include messaging via the broadband/PSTN connection and the GSM/GPRS network.

Generally, the home 402 includes a legacy communications system, which comprises the legacy telephone 422 for making calls over the POTS to the PSTN 408, and therefrom to the wireless office 410 via local exchange carrier (LEC) intermachine trunks (IMTs). In this implementation, a home wireless/broadband communications system includes the IAP 414 (which connects to the legacy system), the VoIP telephone 420, the wireless handset 416, and the broadband connection. The broadband operation facilitates IP connection to the Internet 406, and therefrom to the ASP 404. The ASP 404 also connects to the PSTN 408 to provided dial-up service through the POTS when the home network does not support broadband connectivity. The ASP 404 also provides a service that converts cellular (e.g., GSM) circuit-switched (CS) calls to packetized calls that can be used by the home VoIP telephone 420. The wireless office 410 connects to the ASP 404 via the national SS7 network 412 to provide control signaling between the ASP 404 and the wireless office 410.

In operation, when the user enters the home 402 with the multi-mode handset 416, the IAP 414 sends a beacon and the handset 416 detects the IAP 414. A WiFi transceiver of the handset 416 detects the IAP beacon and associates with the IAP 414. The WiFi client 418 then initiates WLAN registration and authentication through the IAP 414 to a WLAN subsystem (not shown) of the ASP 404 via the Internet broadband connection. The WLAN subsystem facilitates authentication to an HLR (not shown) of the wireless office 410. Once the handset registration and authentication is successful, the WiFi handset 416 initiates IMS registration and authentication to an IMS HSS (not shown) of the ASP 404 via the Internet broadband connection. This also includes subscribing to VoIP services of the ASP 404. This subscription updates the subscriber record in the IMS HSS which triggers an update to the HLR of the wireless office 410. The ASP 404 then routes mobile calls from the home 402 to the WiFi network. Further details for voice handover and SMS message processing are described infra.

Figure 5:
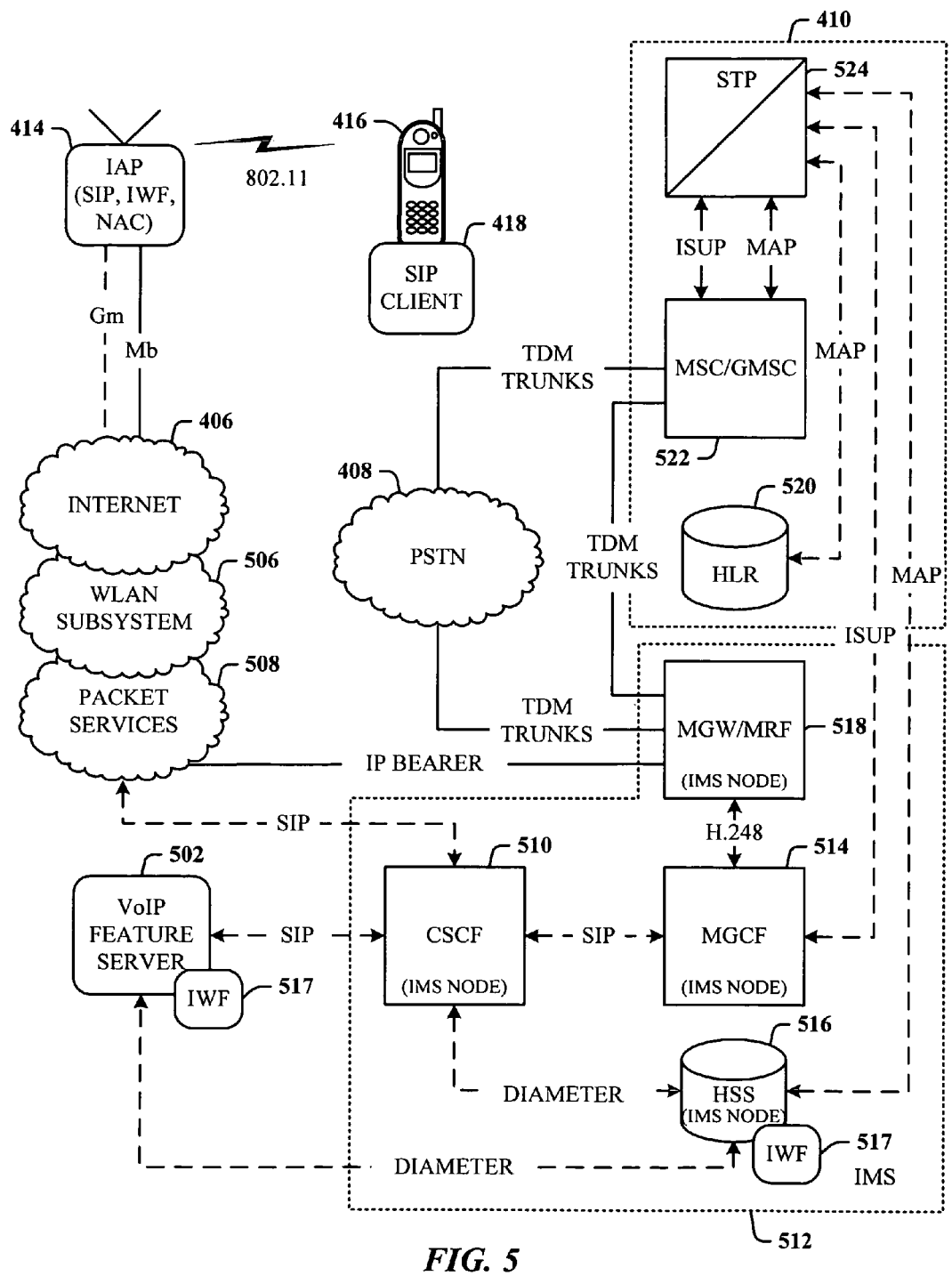
FIG. 5 illustrates an exemplary bearer and signaling architecture that can employ innovative aspects of the disclosed innovation.

FIG. 5 illustrates an exemplary bearer and signaling architecture 500 that can employ innovative aspects of the disclosed innovation. If the WiFi transceiver of the handset 416 (e.g., GSM) is powered off and the IAP 414 detects the handset 416, the IAP 414 initiates a SIP signal to a VoIP feature server 502 to trigger the handset 416 to power on the WiFi transceiver. This procedure assumes the IAP 414 is capable of identifying the handset 416; otherwise, the IAP 414 will operate in the GSM passive mode. When the handset WiFi transceiver detects an IAP beacon signal 504, the transceiver triggers a hysteresis algorithm, which decides whether to associate with the IAP 414. When the handset 416 associates with the IAP 414, the WiFi handset client initiates WLAN subsystem registration and authentication procedures (e.g., 3GPP-$3^{rd}$ Generation Partnership Project). Next, the WiFi handset client initiates an IMS registration and authentication procedure (e.g., 3GPP) that includes subscribing to the VoIP feature service 502. Note that the IAP 414 interface to the broadband Internet connection via a Gm reference point, and from there, across a WLAN subsystem network 506, and a packet services network 508.

The signaling interface facilitates signal communications to the VoIP feature server 502 via SIP protocol through a CSCF (call session control function) entity 510. The CSCF entity 510 is an IMS node and provides session control for subscribers accessing services within the IMS 512. Note that not all entities of the IMS 512 are shown. The IMS 512 also includes an MGCF (media gateway control function) entity 514 that supports the call control function for distributed switching systems. The CSCF entity 510 and the MGCF entity 514 communicate signals via SIP. The IMS 512 also include an HSS (home subscriber server) 516 that facilitates AAA services via a DIAMETER protocol.

The HSS 516 is a master database for the PLMN, and while logically it is viewed as one entity, in practice it will be made up of several physical databases, depending on the number of subscribers and the extent of the services which need to be supported. The HSS 516 can hold variables and identities for the support, establishment and maintenance of calls and sessions made by subscribers. This includes the subscriber's IMSI (international mobile subscriber identity), security variables and location information. The IMSI is a unique identifier allocated to each mobile subscriber in a GSM network. It consists of a Mobile Country Code, a Mobile Network Code and a Mobile Station Identification Number. Either the VoIP feature server 502 or the HSS 516 can employ IWF 517 such that MAP communications can occur. Alternatively, both the VoIP feature server 502 and the HSS 516 can employ the IWF 517.

As well as the basic HLR (home location register)/AuC (authentication center) functions, the HSS 516 can be enhanced through the use of additional databases and reference points. This enables the network to offer the subscriber advanced services and features by interfacing with service application servers based on CAMEL (Customized Applications for Mobile network Enhanced Logic), OSA (open service access) and SIP. CAMEL is a 3GPP initiative to extend traditional IN (intelligent network) services found in fixed networks into mobile networks. The architecture is similar to that of traditional IN, in that the control functions and switching functions are remote. Unlike the fixed IN environment, in mobile networks, the subscriber may roam into another PLMN, consequently the controlling function must interact with a switching function in a foreign network. CAMEL specifies the agreed information flows that may be passed between these networks.

The DIAMETER protocol is intended to provide a framework for any services which require AAA/policy support across many networks such that access and authentication are achieved. The main functions of DIAMETER are to support mobile IP, accounting, network access and strong security. Note that the VoIP server 502 can also communicate to the HSS 516 using the DIAMETER protocol.

Another IMS node depicted is a MGW (media gateway)/MRF (media resource function) entity 518. Conferencing within the IMS 512 can be coordinated by an S-CSCF (Serving-Call Session Control Function), in conjunction with an AS (application server) of the ASP 404 of FIG. 4. The mixing of the various conference participants' media streams is then performed by the MRF which comprises of a MRFC (media resource function controller) and the MRFP (media resource function processor, neither of which are shown. These are very similar in function to the MGCF 514 and a MGW using H.248 in order to establish suitable IP and, if required, SS7 bearers to support the mixed media streams. In the process, the MRFC controls the media streams established by the MRFP, based on information supplied by the S-CSCF, and the relevant application server. H.248 signalling is passed to the MRFP across an Mp interface (not shown). H.248 is the ITU-T (International Telecommunications Union-Telecommunication Standardization Sector) specified media gateway control protocol. It has been specified in conjunction with the IETF (Internet Engineering Task Force). H.248 employs ASN. 1 (Abstract Syntax Notation 1), whereas the IETF version of MGCP (called MEGACO-Media Gateway Control) employs a text-based version of the protocol. Note that the IMS nodes can be located in and managed by any party.

The HSS 516 or VoIP feature server 502 initiates location update procedures with a HPLMN HLR 520, as part of the wireless office 410, and acts as the VPLM VLR (visitor location register) to route mobile terminated calls from the HPLMN to the WiFi network via the IMS MGW/MRF entity 518. The wireless office 410 also includes an MSC (mobile switching center)/GMSC (gateway MSC) entity 522 and a signaling transfer point (STP) 524. The MSC is a telecommunication switch or exchange within a cellular network architecture that is capable of interworking with location databases. A GMSC provides an edge function within a PLMN. It also terminates the PSTN signalling and traffic formats, and converts this to protocols employed in mobile networks. For mobile terminated calls, the GMSC interacts with the HLR 520 to obtain routing information. The STP provides for the transfer of signalling messages from one signaling link to another.

As shown, the IMS HSS entity 516 interfaces signals to the STP 524 via a MAP (mobile application part) protocol. Similarly, the HLR entity 520 of the wireless office 410 interfaces to the STP 524 via MAP, as does the STP 524 to the MSC/GMSC 522. The MGCF entity 514 of the IMS 512 interfaces to the STP 524 via ISUP (ISDN user part). ISUP is part of the SS7 protocol layer, and is used in the setup, management, and release of trunks that carry voice and data between calling and called parties. The MSC/GMSC entity 522 also interfaces to the STP 524 using ISUP.

The MSC/GMSC entity 522 and MGW/MRF entity 518 exchange bearer traffic directly over TDM (time division multiplex) trunks and over TDM trunks via the PSTN 408. The MGW/MRF entity 518 communicates IP traffic to the packet services network over an IP bearer.

In the case of automatically detecting the presence or absence of the GSM handset 416 in the indoor network, the location update approach can provide a more reliable solution. This solution does not rely on the indoor network to deactivate call redirection, as is the case with the CFU approach. When the GSM handset 416 loses contact with the indoor network, the GSM network deactivates call redirection to the home network. The handset 416 will power-on the GSM transceiver and initiate a registration and location update with the GSM network. After this procedure is completed, the GSM sends the indoor network a location cancellation message. The GSM handset 416 does not need to maintain contact with the indoor network to keep call redirection active. This approach allows the subscriber to power off the GSM handset 416. Thus, the handset 416 activates the call redirection process and the GSM network deactivates the call redirection process. This does not require that the GSM network activate the redirection process.

The local wireline network and/or ASP 404 of FIG. 4 can use AIN (advanced intelligent networking) capabilities and CAMEL to implement optimal routing whenever the subscriber is registered in the indoor network. Further, the wireline network can use caching with AIN capabilities and/or SIP signaling to optimize call signaling for mobile terminated calls. This method implies the use of E.164 and ENUM between the PSTN and HPLMN. E.164 is the format of global switched telephone numbers are defined by the ITU-T E164 standard. The 16-digit number is split into international, national and user number portions (e.g., +44(0) 1189 497094). ENUM is an IETF proposal in which DNS (domain name server) systems can be used to translate E.164 telephone numbers into URL (uniform resource locator) and IP addresses.

For PSTN-to-mobile terminated calls, the PSTN uses ENUM to lookup the SIP URL for the public E.164 number and queries the SIP subscriber and/or presence service for availability to route the call directly to the SIP URL or the temporary E.164 number.

With respect to emergency services (e.g., E911 services) over WiFi, physical location and integrity can be addressed. Location can be provided to a PSAP (public safety answering point) using street address of the broadband access point. The customer can be required to enter the street address of the broadband access point into a web form during subscription, or during a change of address. The PSAP is a physical location where 9-1-1 emergency telephone calls are received and then routed to the proper emergency services. Integrity of the location information can be based on a pseudo-honor system. The VoIP service can detect a change in the status of the broadband access point and force the subscriber to re-enter the emergency services location information. The subscriber can also be legally bound to comply with the dual-mode emergency services requirements or choose not to subscribe to emergency services.

Figure 6:
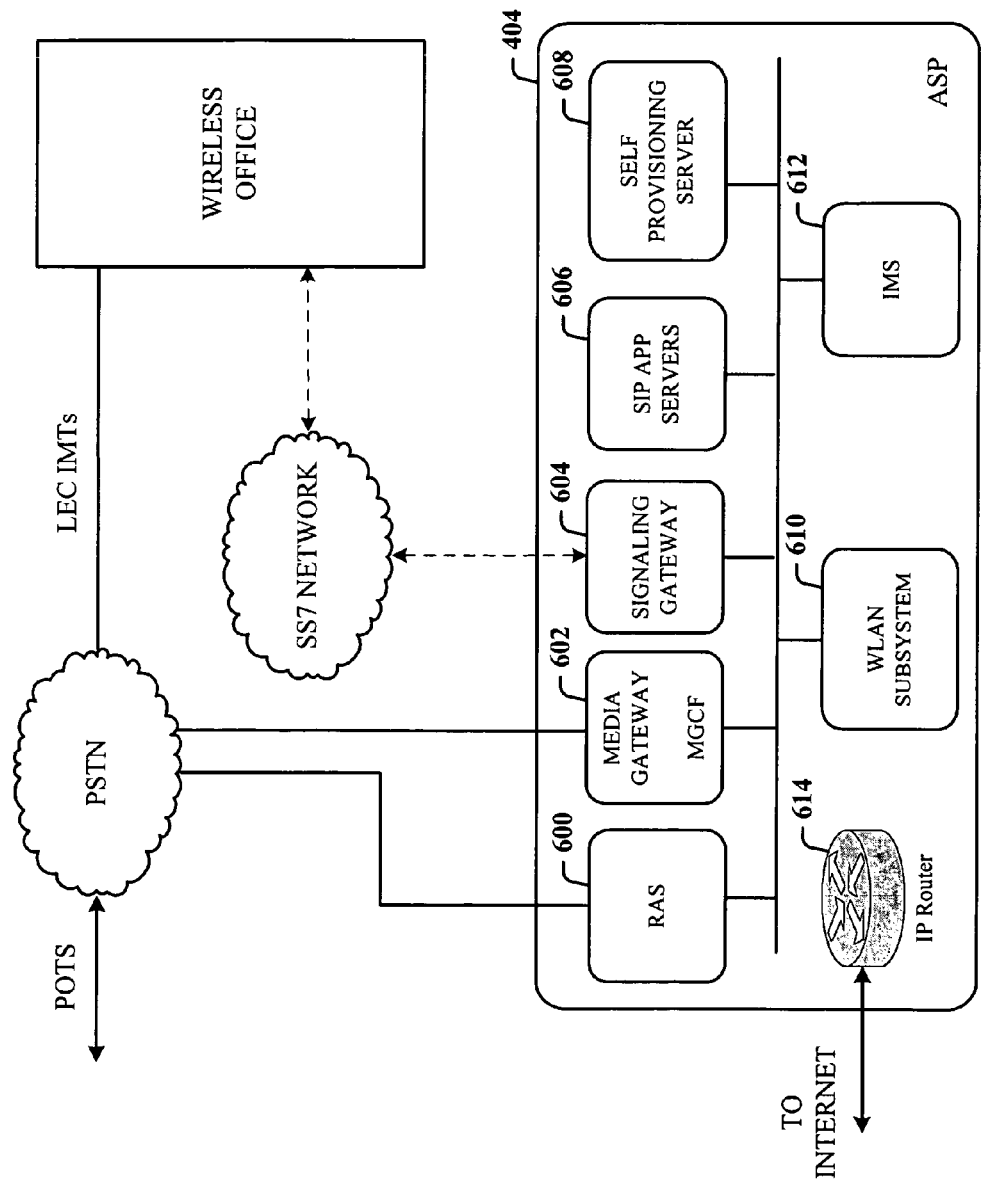
FIG. 6 illustrates a more detailed diagram of the ASP in accordance with the disclosed innovation.

Referring now to FIG. 6, there is illustrated a more detailed diagram of the ASP 404 in accordance with the disclosed innovation. The ASP 404 includes a remote access service (RAS) 600 that supports dial-up services through the POTS when the indoor network does not support broadband connectivity. A media gateway 602 employs a media gateway control function (MGCF) to facilitate mediating or converting GSM circuit-switched calls to packetized voice calls that can be used by VoIP devices. The MGCF controls the parts of the call state that pertain to connection control for media channels in the media gateway. A signaling gateway 604 converts a SIGTRAN formatted signaling message to a legacy SS7 signaling message transported over TDM circuits and includes an SMS message handler for routing SMS messages between the HPLMN and the indoor network.

A SIP application server 606 consists of several logical services. A SIP registrar component serves as the main VoIP subscription register (or database) where the other network elements query to get information on the subscriber such as is the subscriber active and receiving calls on the Indoor Network, for example. A GSM IWF component supports GSM authentication, access control, and MAP signaling. It provides logic to handle GSM registrations; CFU (call forwarding unconditional) activation and deactivation, location updates, and location cancel messages. A GSM VLR acts as a standard GSM VLR to receive subscriber information from the HLR. It triggers subscriber updates in the SIP registrar. A SIP DNS acts as a standard DNS server with support for E.164 and SIP name addressing. A VoIP Feature Server component provides voice communications call control and processing based on SIP signaling.

The ASP 404 also includes a self-provisioning server 608 that provides a web services interface and/or Internet portal that enables an ASP or individual subscriber to self-provision and manage services. A WLAN subsystem 610 (e.g., 3GPP) (similar to WLAN subsystem 506) consists of a packet data gateway (e.g., a VPN-virtual private network server) and an AAA (access, authorization and accounting) server (e.g., 3GPP) that enables the subscriber to use WiFi access as a bearer to packet services (e.g., 3GPP). An IMS entity 612 (similar to IMS entity 512) consists of a group of network elements that enable the service delivery of SIP-based applications, such as VoIP. An IP router 614 facilitates routing IP traffic between the ASP 404 and the Internet.

Figure 7:
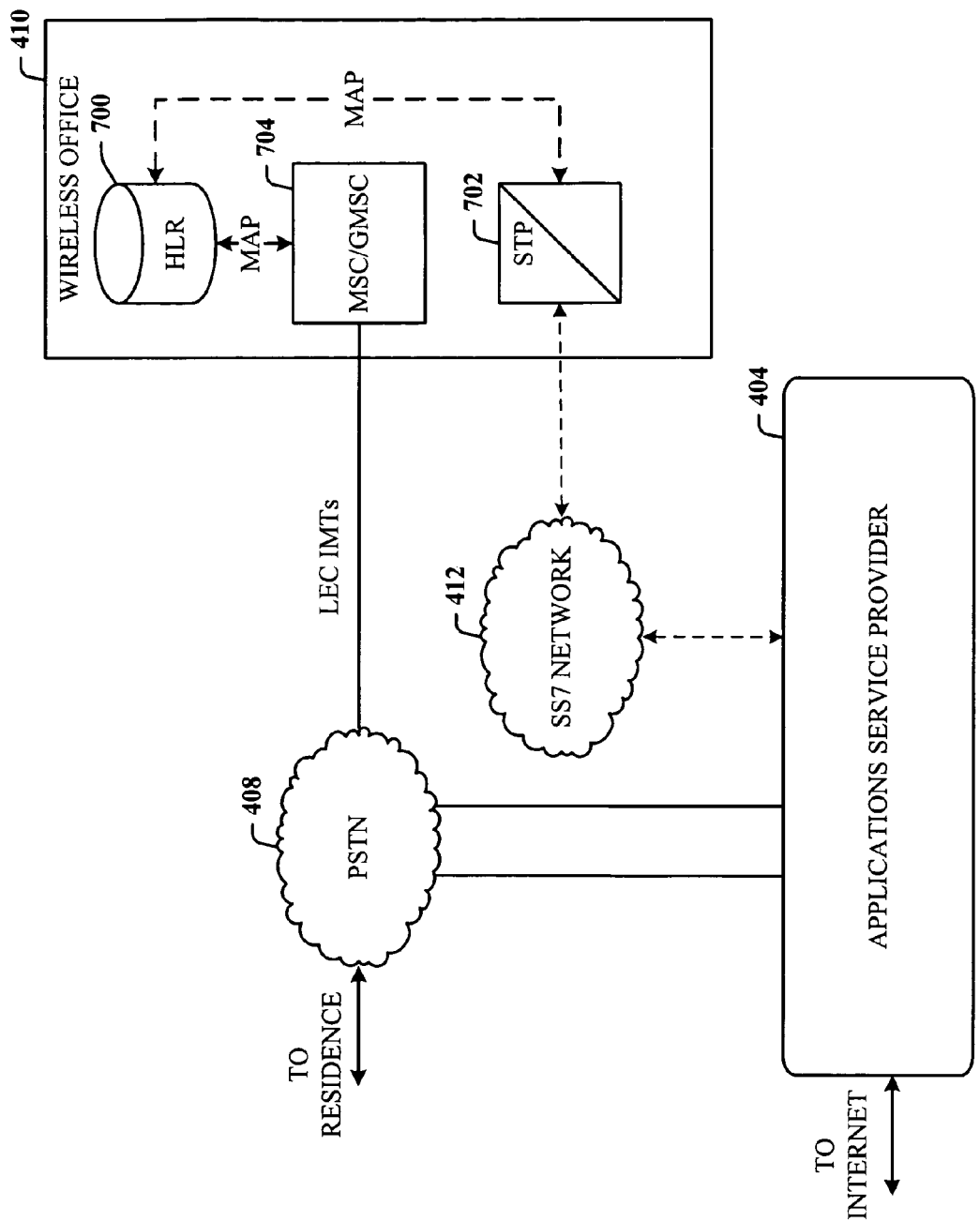
FIG. 7 illustrates a more detailed diagram of entities of the wireless office.

FIG. 7 illustrates a more detailed diagram of entities of the wireless office 410 of FIG. 4. An HLR 700 (similar to HLR 520 of FIG. 5) is provided which is an SS7 database employed in cellular networks. The HLR 700 interfaces to an STP 702 (similar to STP 524 of FIG. 5) via MAP as part of the SS7 protocol. MAP standards address registration of carriers and intersystem handoff procedures. The STP 702 interfaces to the national SS7 network 412 for signal communications to the ASP 404. The wireless office 410 can also include an MSC/GMSC 704 (similar to MSC/GMSC 522 of FIG. 5) that interfaces to the HLR 700 via MAP, and to the PSTN 408 via the LEC IMTs. The GMSC is a means to route a mobile station call to the MSC that contains the called party HLR.

Figure 8A:
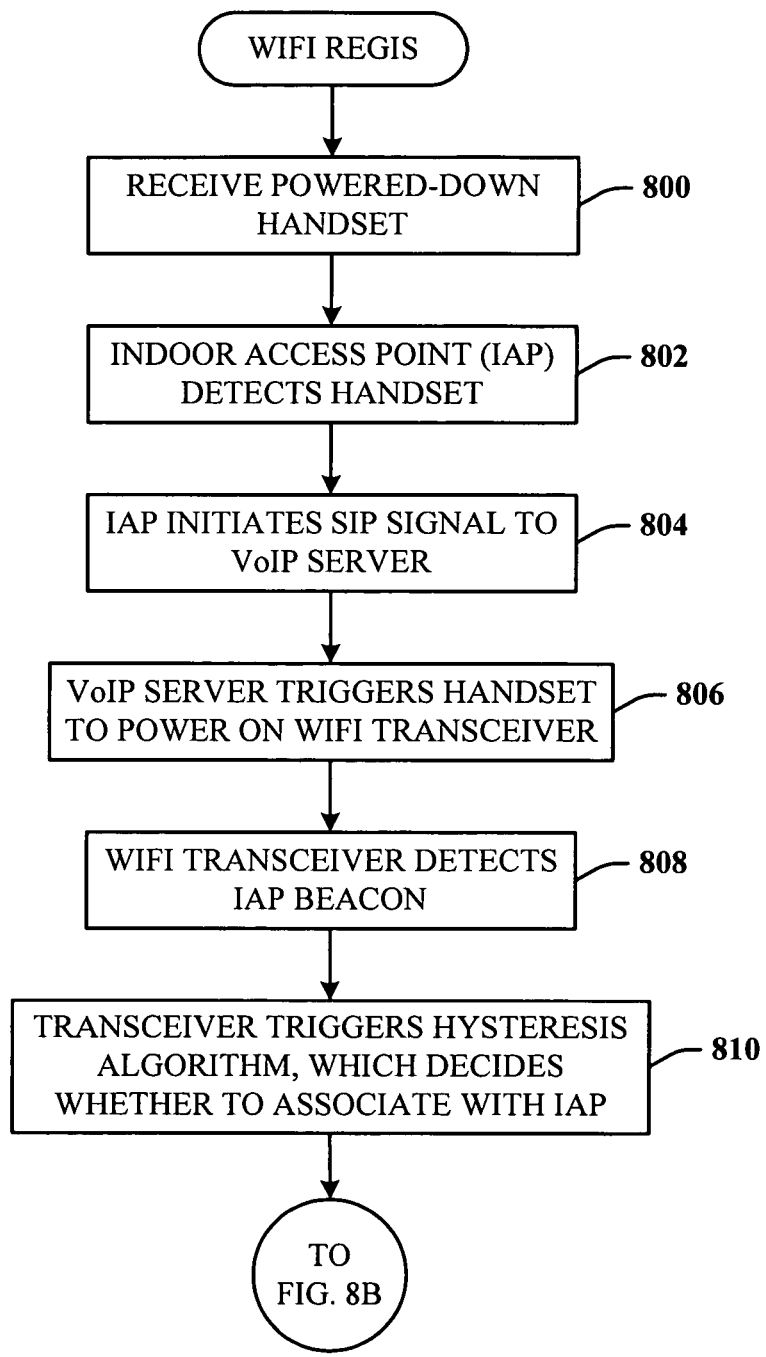
FIGS. 8A and 8B illustrate a methodology of registering a subscriber in a WiFi network.
Figure 8B:
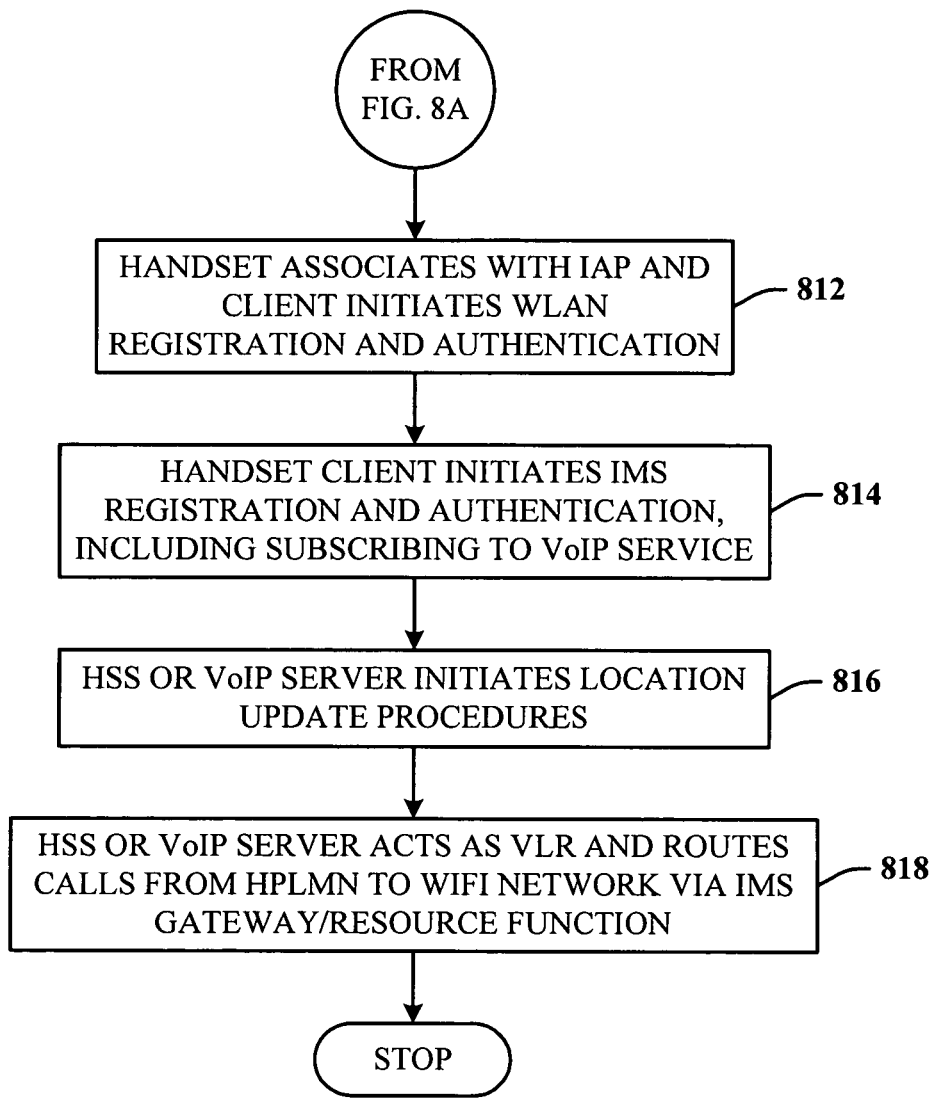

FIGS. 8A and 8B illustrate a methodology of registering a subscriber in a WiFi network. If the WiFi transceiver of the handset is powered off and the IAP detects the handset, the IAP can initiate a SIP signal to the VoIP server to trigger the handset to power on the WiFi transceiver. The methodology assumes the IAP is capable of identifying the GSM handset; otherwise, the IAP will operate in the GSM passive mode. Beginning with FIG. 8A, at 800, the handset is received in a power-down mode. At 802, the IAP detects the handset. At 804, the IAP initiates a SIP signal to a VoIP server. At 806, the VoIP server triggers the handset to power on its WiFi transceiver. At 808, when the WiFi transceiver detects the IAP beacon signal, the transceiver triggers a hysteresis algorithm which decides whether to associate with the IAP, as indicated at 810.

Continuing with FIG. 8B, the handset associates with the IAP and the handset client initiates WLAN (e.g., 3GPP) registration and authentication, as indicated at 812. At 814, the WiFi handset client initiates the IMS registration and authentication procedures (e.g., 3GPP) that include subscribing to the VoIP service. At 816, an HSS (home subscriber server) or VoIP feature server initiates location update procedures. The update procedures are initiated with the HPLMN HLR, and the HSS or VoIP feature server acts as the visitor PLMN (VPLMN) VLR to route mobile terminated calls from the HPLMN to the WiFi network via the IMS media gateway/media resource function, as indicated at 818.

Figure 9:
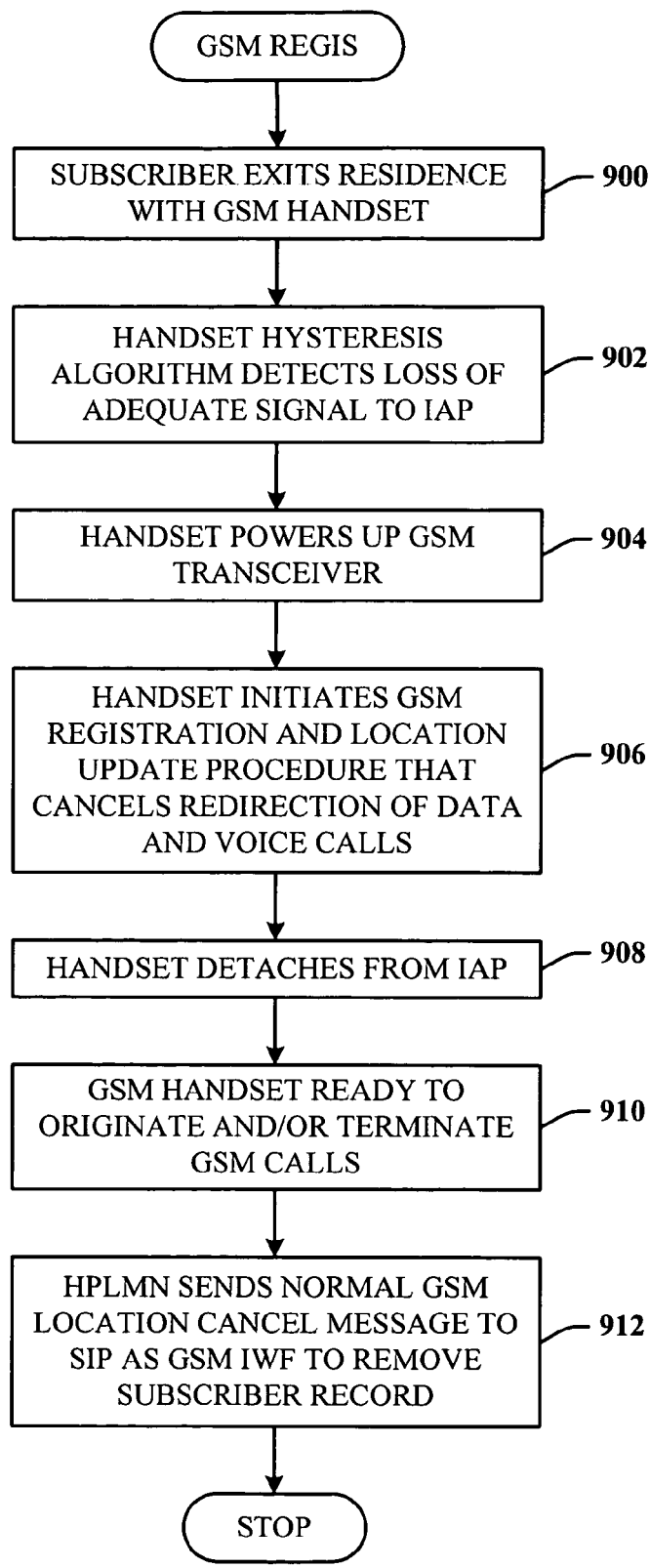
FIG. 9 illustrates a methodology of registering a subscriber in a GSM network.

FIG. 9 illustrates a methodology of registering a subscriber in a GSM network. At 900, the subscriber (or mobile user) exits the residence with the GSM handset. At 902, the hysteresis component in the handset detects that the IAP received signal strength falls below a predetermined acceptable level. Once this happens, at 904, the GSM transceiver is powered-up, and GSM registration occurs, at 906. The GSM handset initiates a normal GSM registration and location update procedure that cancels the redirection of data and voice calls. After registration, the handset detaches from the IAP, as indicated at 908. At 910, the GSM handset is ready to originate and terminate calls over the GSM network. At 912, the HPLMN sends a normal GSM Location Cancel message to the SIP application server GSM IWF to remove the subscriber record.

Figure 10:
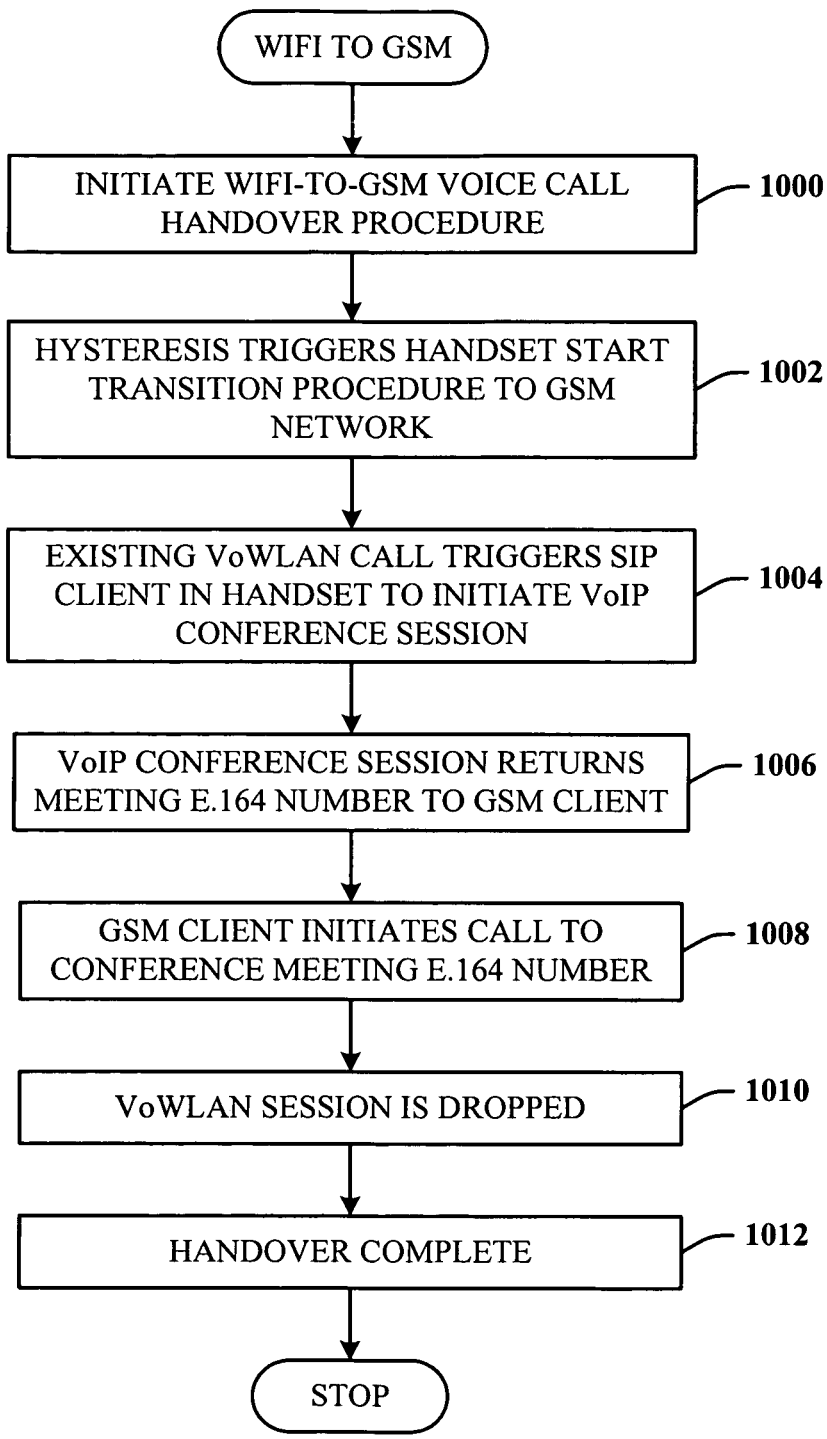
FIG. 10 illustrates a methodology of handing over voice calls from a WiFi network to a GSM network.

FIG. 10 illustrates a methodology of handing over voice calls from a WiFi network to a GSM network. At 1000, the user exists a building, and the WiFi-to-GSM voice call handover procedure is initiated. At 1002, the hysteresis algorithm of the handset triggers the handset to start the transition procedure to the GSM network. At 1004, the existing VoWLAN (voice over WLAN) call triggers the SIP client in the handset to initiate a VoIP conference session. At 1006, a VoIP conference session returns a conference meeting E.164 number to the GSM handset client. At 1008, the GSM handset client initiates a call to the conference meeting E.164 number. At 1010, the VoWLAN voice session is dropped, and the handover is completed, as indicated at 1012.

Figure 11:
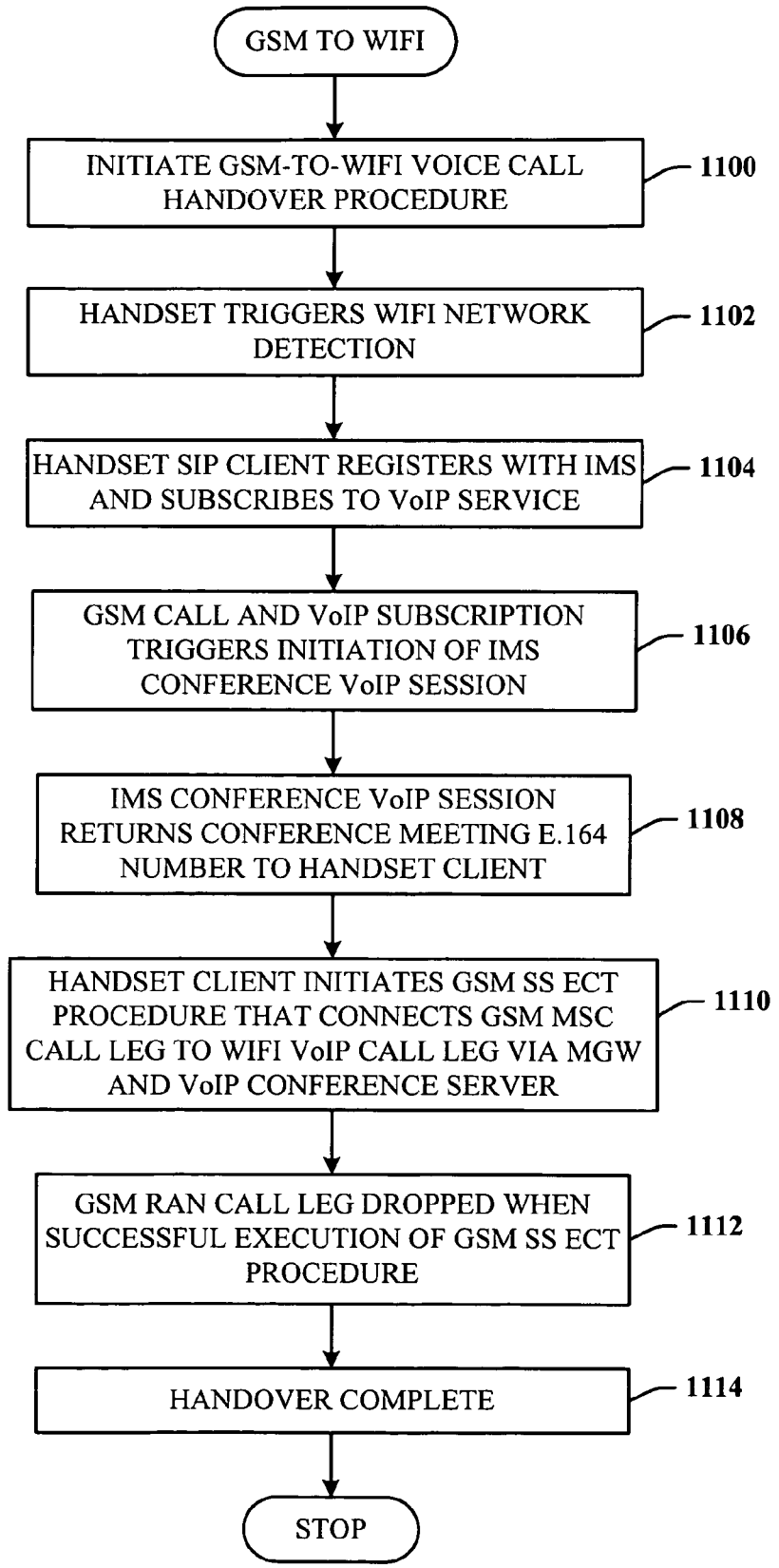
FIG. 11 illustrates a methodology of handing over voice calls from a GSM network to a WiFi network.

FIG. 11 illustrates a methodology of handing over voice calls from a GSM network to a WiFi network. At 1100, subscriber enters a building and the WiFi-to-GSM network handover is initiated. At 1102, WiFi network detection is triggered on the handset. At 1104, the handset SIP client registers with IMS and subscribes to the VoIP service. At 1106, the existing GSM voice call and VoIP subscription triggers the SIP client on the handset to initiate an IMS conference VoIP session. At 1108, the IMS conference VoIP session returns a conference meeting E.164 number to the GSM handset client. At 1110, the GSM handset client initiates a GSM SS (supplementary services) ECT (explicit call transfer) procedure to connect the GSM MSC call leg to the WiFi VoIP call leg via the MGW and VoIP conference server. At 1112, successful execution of the GSM SS ECT procedure triggers the GSM RAN (radio access network) call leg to drop. At 1114, the handover is completed.

Figure 12:
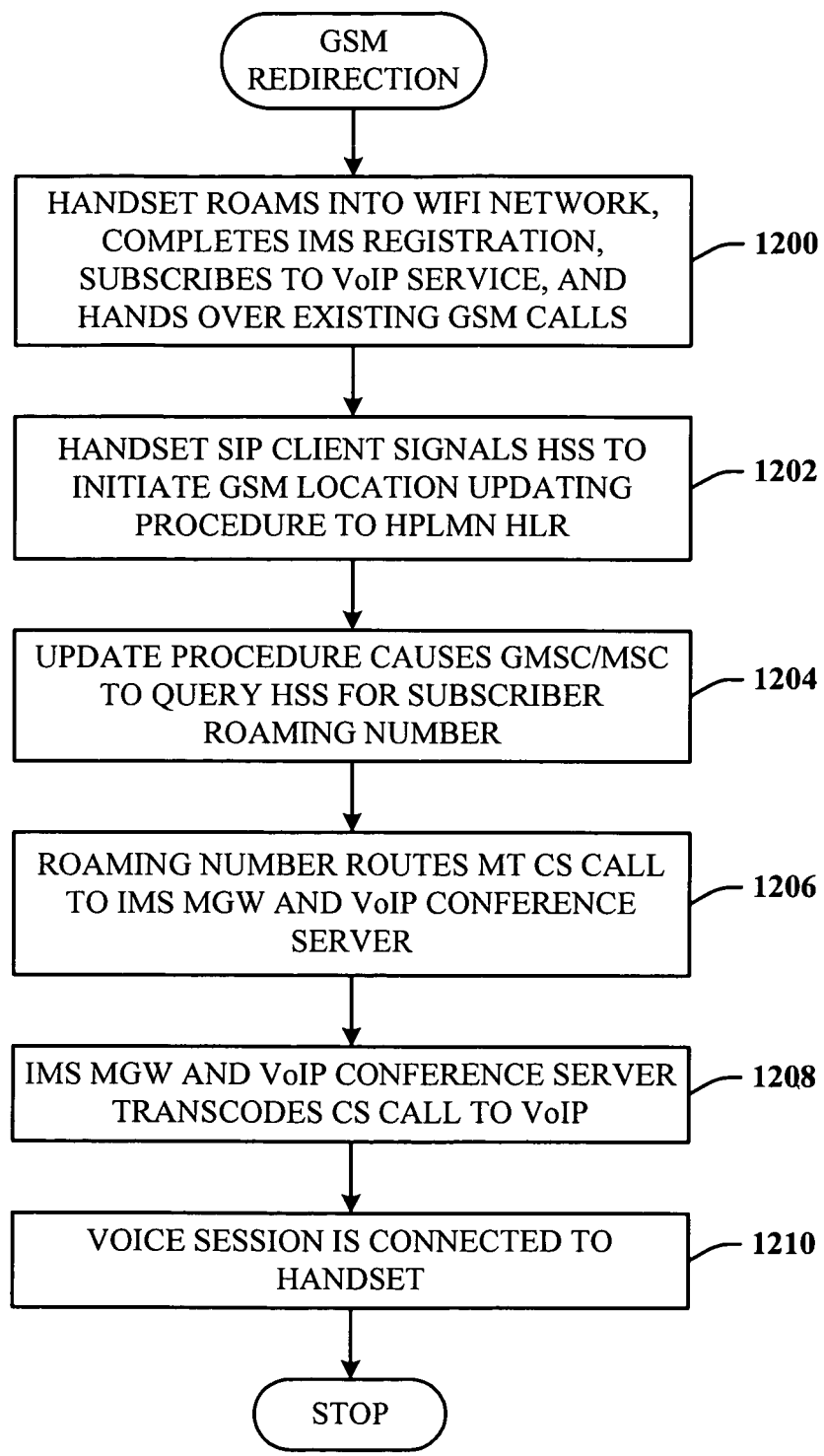
FIG. 12 illustrates a methodology of redirecting a GSM call according to another aspect.

FIG. 12 illustrates a methodology of redirecting a GSM call according to another aspect. This methodology assumes the HSS provides VPLMN VLR functionality and interconnects with the HPLMN GMSC/MSC using the C and D interfaces. The feature is activated when the dual-mode handset roams into the WiFi network and is used to redirect GSM mobile terminated call from the GSM network to the WiFi network. At 1200, the dual-mode handset roams into the WiFi network and completes the IMS registration, subscribes to VoIP service, and hands over any existing GSM calls. At 1202, the SIP client on the handset signals the HSS to initiate a GSM location updating procedure to the HPLMN HLR. At 1204, the GSM location updating procedure causes the HPLMN GMSC/MSC to query the HSS to the dual-mode subscriber's roaming number. At 1206, the dual mode subscriber's roaming number routes the mobile terminated CS call to the IMS MGW and VoIP conference server. At 1208, the IMS MGW and VoIP conference server transcodes the CS call to VoIP. At 1210, the IMS MGW and VoIP conference server connects the voice session the handset. Note that in one implementation, mobile originated SMS messages can follow the reverse path of mobile terminated SMS messages. In another implementation, mobile originated SMS messages do not follow the reverse path of mobile terminated SMS messages.

Figure 13:
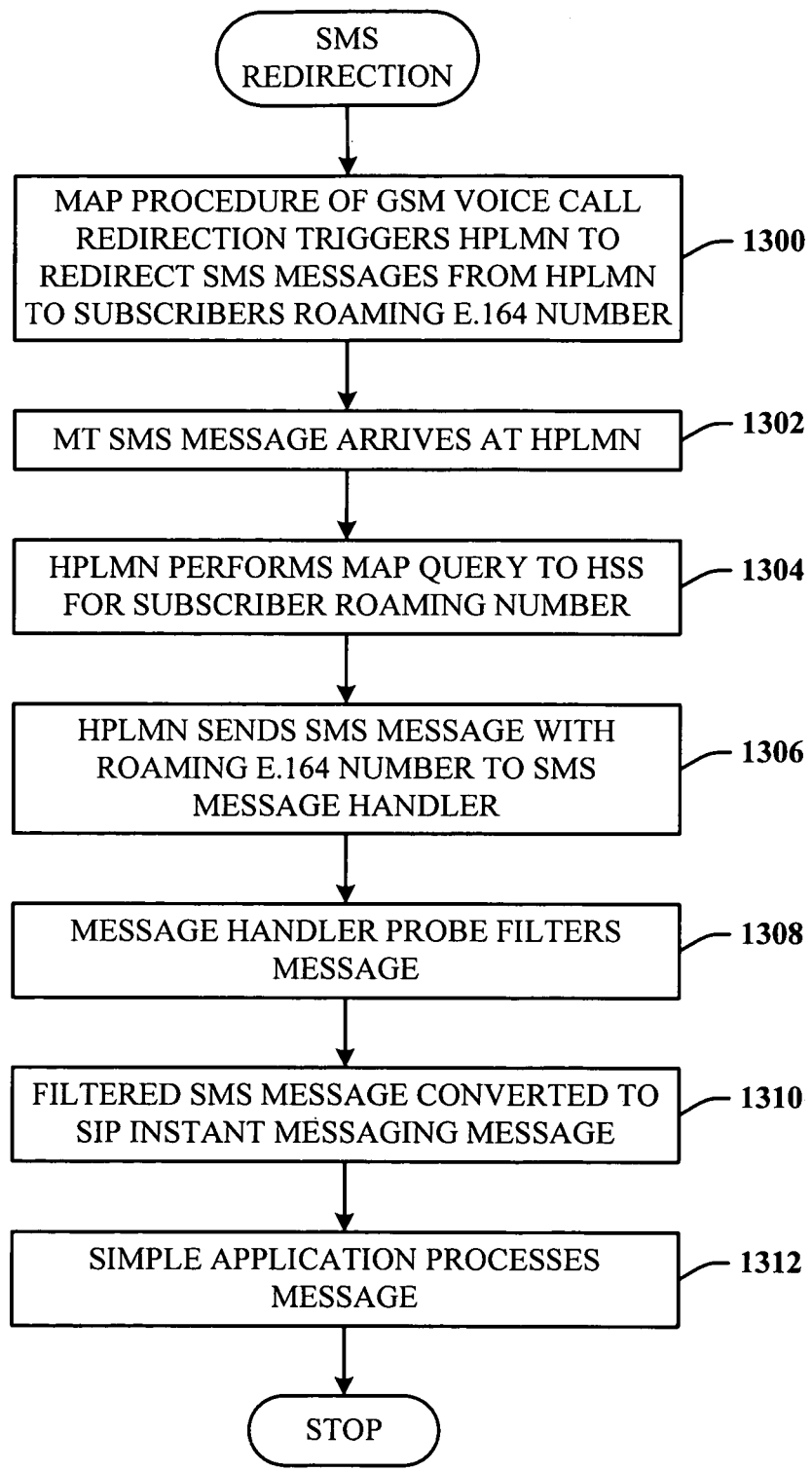
FIG. 13 illustrates a methodology of redirecting SMS messages from the HPLMN to the roaming E.164 number.

FIG. 13 illustrates a methodology of redirecting SMS messages from the HPLMN to a roaming E.164 number. At 1300, the GSM Locating Update MAP procedure performed in GSM Voice Call Redirection triggers the HPLMN to redirect SMS messages from the HPLMN to the subscriber's roaming E.164 number via SS7. At 1302, a mobile terminated SMS message arrives at the HPLMN. At 1304, when the mobile terminated SMS message arrives, the HPLMN performs a MAP query to the HSS to obtain the subscriber's roaming number. At 1306, the HPLMN sends the SMS message via SS7 and addressed to the roaming E.164 number to the SGW/SMS Message Handler. At 1308, the SGW/SMS Message Handler's SS7 probe filters the SS7 message that contains the subscriber's SMS message. At 1310, the filtered SMS message is converted to SIP instant messaging message. At 1312, the filtered SMS message is processed by a SIMPLE application.

There can be at least two bearer methods for SMS. One is the standard use of the existing voice path control channel or one of the control channels such that the caller can receive voice and SMS messages at the same time. Another method is to receive SMS over GPRS. Thus, there can be different procedures for redirecting SMS messages, depending on the bearer mechanism.

FIGS. 14-17 illustrate signal flow diagrams of one or more aspects of the innovative redirection architecture. Note that for simplicity, not all signal procedures are shown and some procedures may be simplified.

Figure 14:
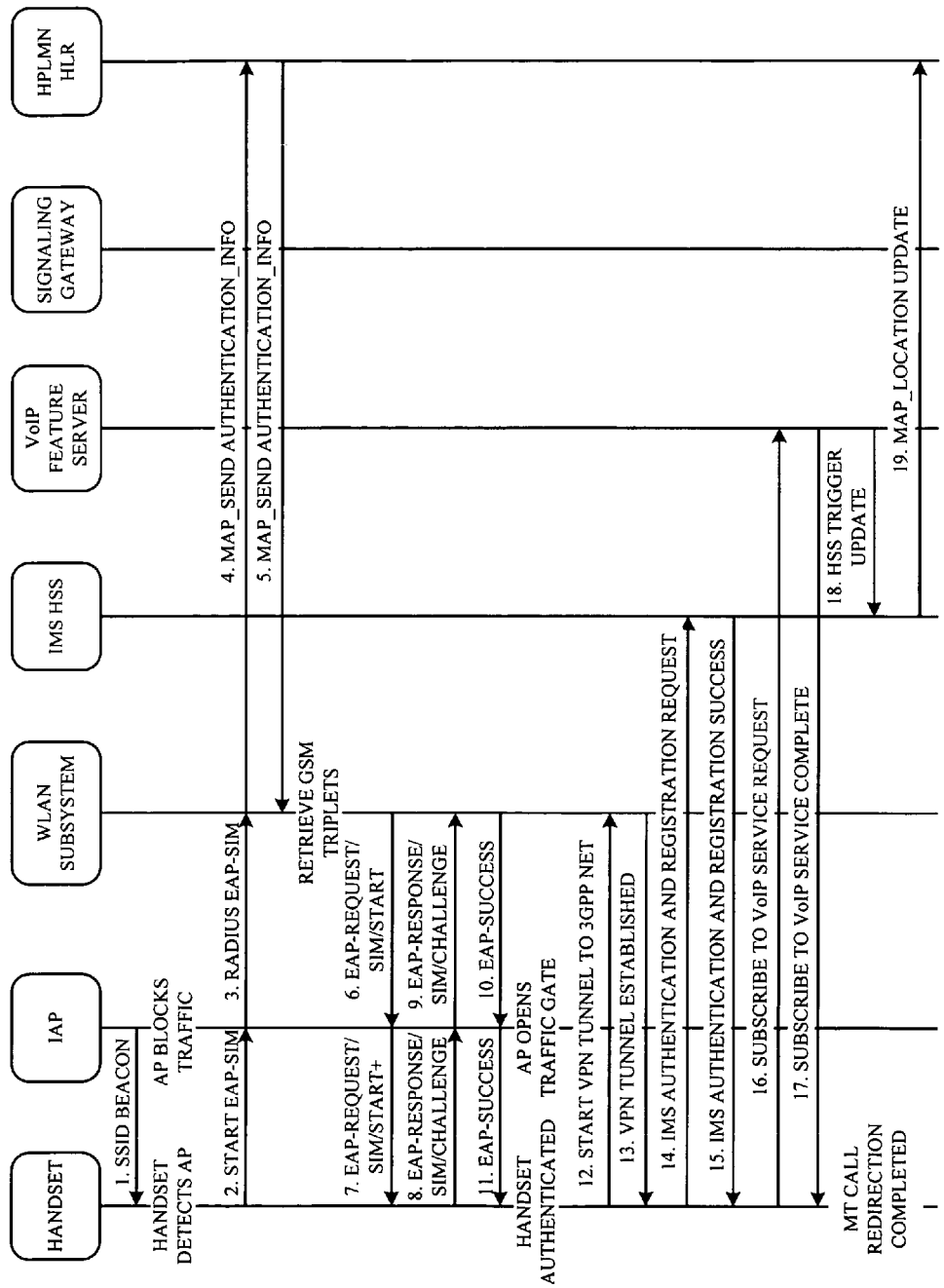
FIG. 14 illustrates a messaging and signaling flow diagram for WiFi registration.

FIG. 14 illustrates a messaging and signaling flow diagram for WiFi registration. The procedural flow is described as follows. Initially, when the user brings the handset into range, the WiFi IAP broadcasts an SSID (service set identifier) signal within the indoor network. The SSID or network name is used within IEEE 802.11 networks to identify a particular network. It is usually set by the administrator setting up the WLAN and will be unique. The SSID may be broadcast from the IAP within the wireless network to enable handsets to determine to which network to associate.

In another scenario, the IAP does not broadcast the SSID, but the handset is capable of detecting the IEEE 802.11 association, and this will be the trigger. In either case of where the SSID is broadcast or not broadcast, once the handset is able to access an authorized IAP, this can be a trigger for the redirection process.

The handset then detects the IAP signal. The handset WiFi client starts an 802.1x EAP-SIM (Extensible Authentication Protocol-Subscriber Identity Module) authentication procedure. The IAP blocks all non-authentication packets coming from the handset. The WiFi IAP NAC function serves as a radius client that communicates with a 3GPP WLAN Subsystem (e.g., 3GPP AAA Server) and exchanges SIM credentials. The 3GPP WLAN Subsystem queries the HPLMN HLR via a MAP_SEND AUTHENTICATION_INFO message to retrieve the GSM triplets used in the SIM authentication procedure. The HPLMN HLR returns the GSM triplets in an SS7 MAP_SEND AUTHENTICATION_INFO message. The 3GPP WLAN Subsystem retrieves the GSM triplets from the MAP message.

The 3GPP WLAN Subsystem starts the EAP-SIM procedure with the handset. The handset runs a GSM authentication algorithm on the GSM triplets and returns challenge response to the WLAN Subsystem. The WLAN Subsystem validates the challenge response and returns an EAP-Success message to the WiFi access point indicating success authentication of the handset. The WiFi access point returns the EAP-Success message to the handset. The WiFi network access authentication process is then complete. The WiFi access point opens the traffic gate and allows the handset to send and receive all packets. WLAN Subsystem tunneling procedures are initiated and completed. 3GPP IMS registration procedures using SIM are then initiated and completed. The handset sends a SIP Subscribe message to the VoIP Feature Server to access VoWLAN services. The VoIP Feature Server replies with SIP OK to complete the service. The VoIP Feature Server updates the subscriber record in the HSS to trigger the HLR location update procedure. The HSS sends a MAP_LOCATION_UPDATE message to the HLR. Mobile terminated call redirection to the WiFi network is now complete.

Figure 15:
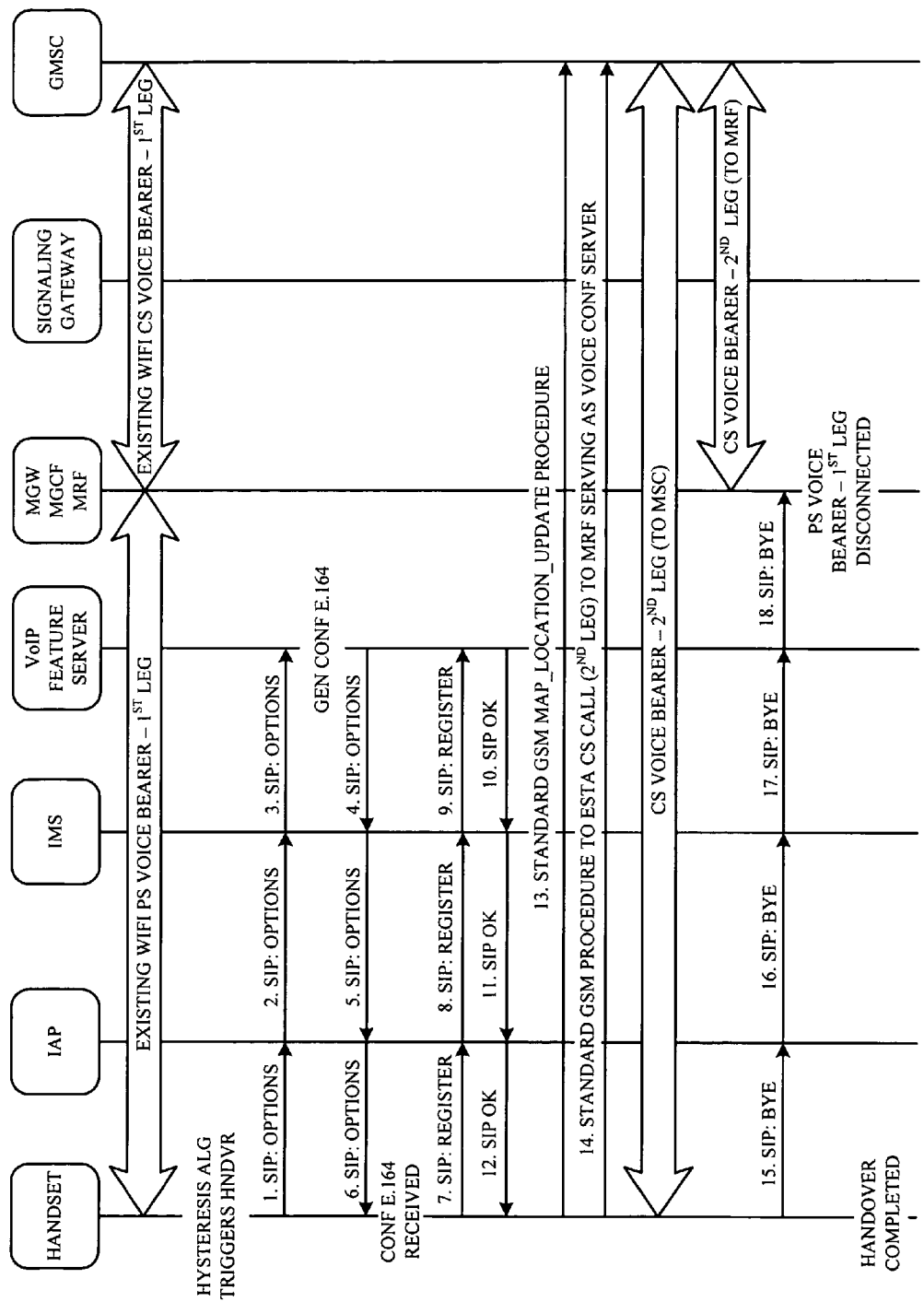
FIG. 15 illustrates a messaging and signaling flow diagram for WiFi-to-GSM voice handover.

FIG. 15 illustrates a messaging and signaling flow diagram for WiFi-to-GSM voice handover. The procedural flow is described as follows. An existing voice call is established between a dual-mode handset in WiFi mode and a standard GSM handset. The call is routed through a media gateway, which provides a voice conferencing function. A hysteresis algorithm triggers the WiFi-to-GSM handover procedure. The handset sends a SIP OPTIONS message to the VoIP Feature Server to request the voice conferencing E.164 dial in number for the existing voice session. The VoIP Feature Server then generates a voice conferencing E.164 dial-in number. The VoIP Feature Server returns the voice conferencing E.164 dial-in number to the handset in a SIP OPTIONS reply. The handset retrieves the voice conferencing E.164 dial-in number. The handset sends a SIP REGISTER message with an expiration value of zero to the VoIP Server. This ends the SIP registration.

The VoIP server replies with a SIP OK message to confirm deregistration, which triggers the handset to activate the GSM transceiver and register on the GSM network by initiating a standard GSM registration and location update procedure. The handset signals the GSM network to establish a CS call via the MSC to the MRF voice conferencing function. A GSM CS bearer is established between the handset, MSC, and MRF. The handset then sends a SIP BYE message over WiFi to the VoIP Feature Server to end the WiFi packet-switched (PS) voice bearer session ($1^{st}$ leg). The PS voice bearer session ($1^{st}$ leg) is disconnected. The handover procedure is then completed.

Figure 16:
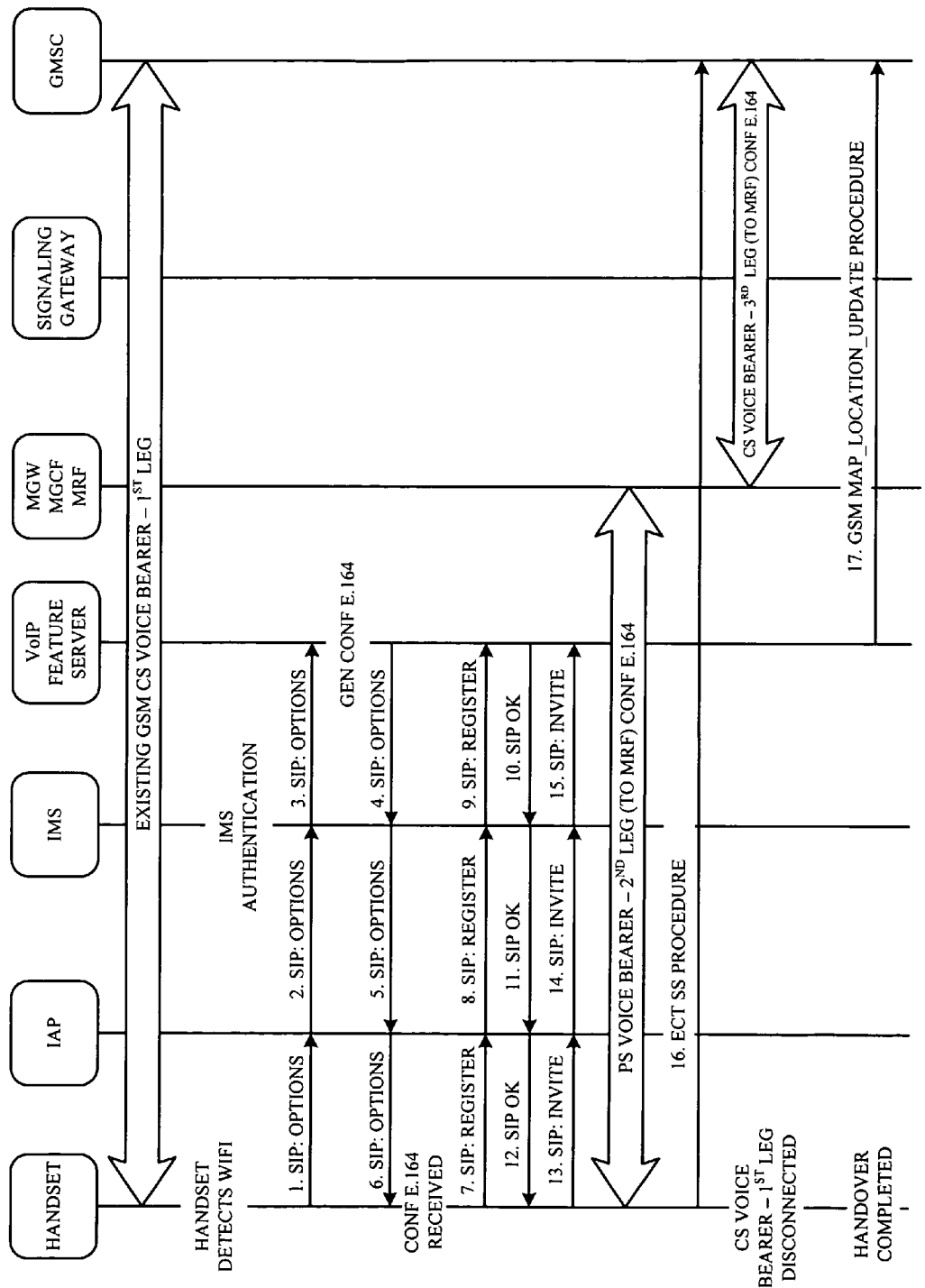
FIG. 16 illustrates a messaging and signaling flow diagram for GSM-to-WiFi voice handover.

FIG. 16 illustrates a messaging and signaling flow diagram for GSM-to-WiFi voice handover. The procedural flow is described as follows. A GSM CS call is ongoing between the dual-mode handset and another CS destination (mobile or PSTN). The handset detects the IEEE 802.11 access point beacon signal. The handset accesses the WiFi network and authenticates the IMS client and network with the 3GPP IMS system. The dual-mode handset client sends a SIP OPTIONS message to the VoIP Feature Server to query for the E.164 conference number that it uses to bridge the voice PS session and the CS session. The VoIP Feature Server generates the E.164 conference number. The VoIP Feature Server returns the E.164 conference number to the dual-mode handset in a SIP OPTIONS message. The handset retrieves the E.164 conference number from the SIP OPTIONS message, which is used in the later SIP INVITE message. The dual-mode handset client sends a SIP REGISTER message to subscriber to the VoIP service. The VoIP Feature Server returns a SIP OK message.

The dual-mode handset sends a SIP INVITE message to setup the PS voice bearer path between the dual-mode handset and the MRF. The VoIP Feature Server returns a SIP OK message (not shown). The second leg PS voice bearer is established. The dual-mode handset sends a signaling procedure (e.g., 3GPP ECT SS) to the MSC to connect party B to the E.164 conference number. The third leg CS voice bearer is established. The first leg CS voice bearer is disconnected. Handover is complete. The VoIP Feature Server (or HSS) sends location updating message to the GSM HLR that redirects GSM MT calls to the indoor network.

Figure 17:
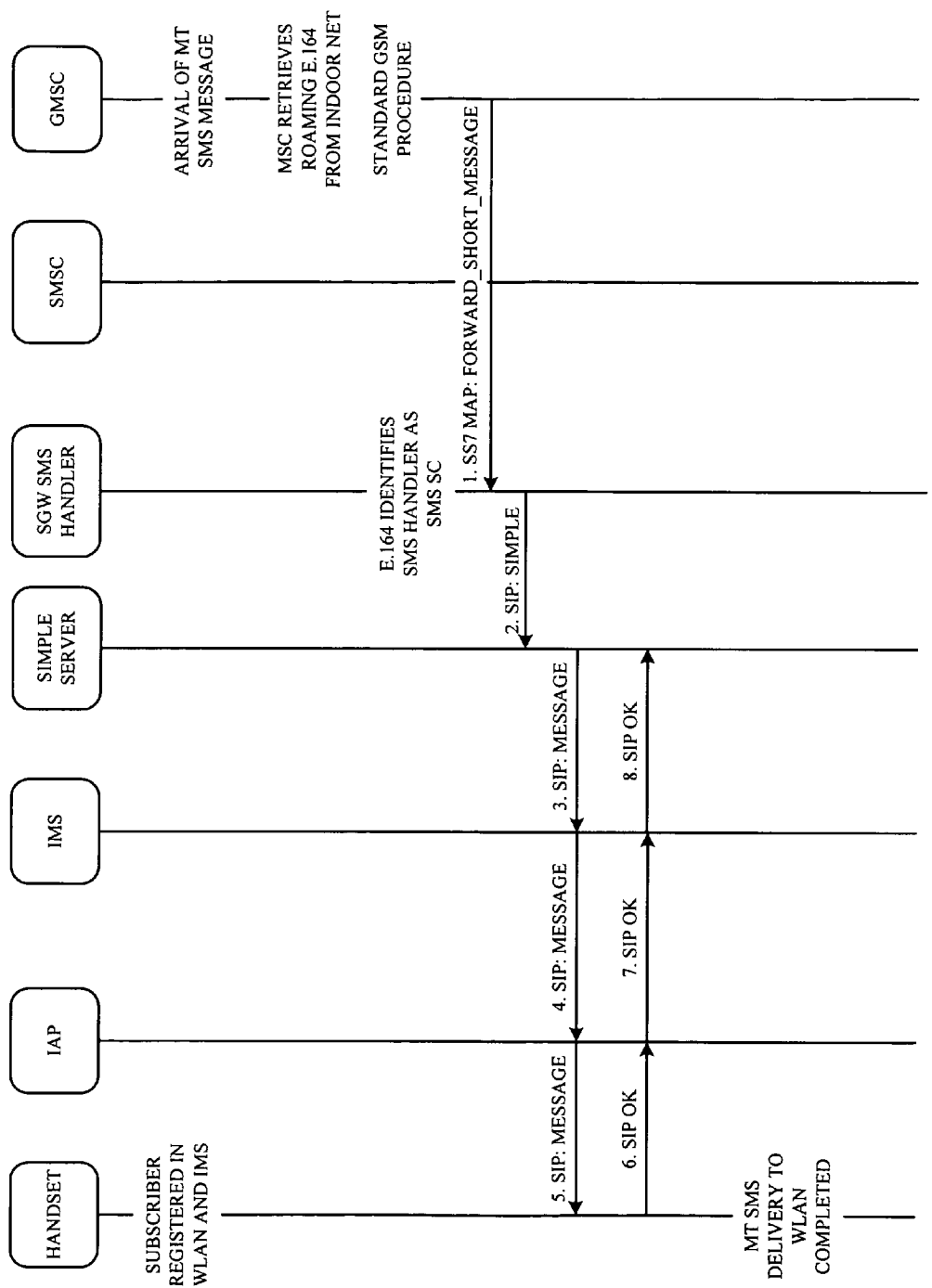
FIG. 17 illustrates a message and signaling flow diagram for redirecting an MT SMS message to the WiFi handset.

FIG. 17 illustrates a message and signaling flow diagram for redirecting an MT SMS message to the WiFi handset. The procedural flow is described as follows. Initially, the subscriber is registered in the WLAN and IMS, and the IMS has updated the GSM HLR to redirect mobile terminated SMS messages to the WiFi network. The GSMS receives an SMS message for the subscriber. The GMSC retrieves the roaming E.164 number from the indoor network via a GSM procedure. The roaming E.164 number identifies the SGW SMS Handler as the SMS SC (switching center). The GMSC forwards the SMS message in an SS7 MAP: Forward_Short_Message procedure to the SMS Handler. The SMS Handler processes the message content and sends it to a SIMPLE server using SIMPLE procedures. The SIMPLE server sends a SIP: MESSAGE to the subscriber. The subscriber replies with SIP OK. The mobile terminated SMS message delivery is completed.

Figure 18:
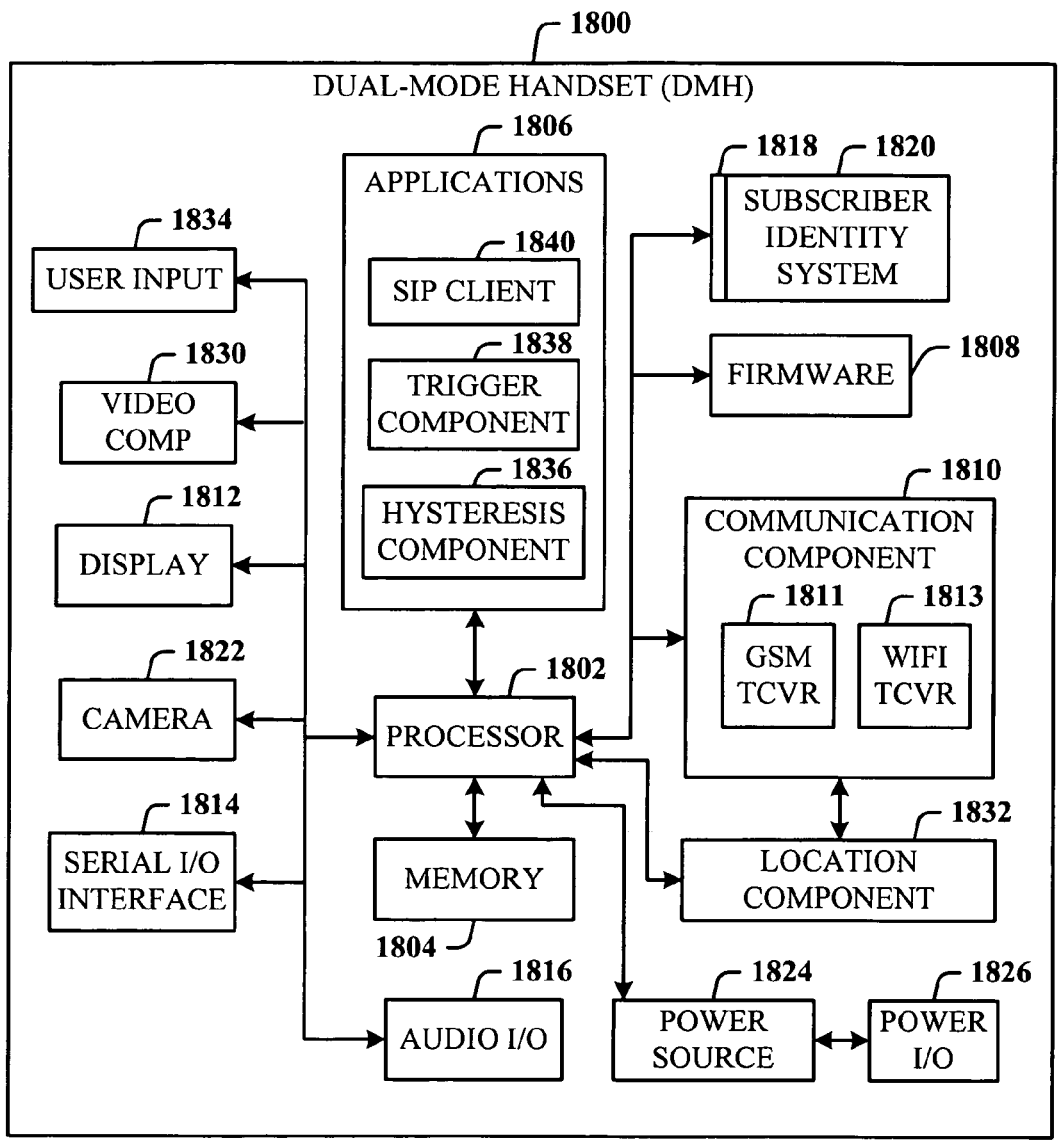
FIG. 18 illustrates a schematic block diagram of a dual-mode handset in accordance with an innovative aspect.

FIG. 18 illustrates a schematic block diagram of a dual-mode handset (DMH) 1800 in accordance with an innovative aspect. In order to provide additional context for various aspects thereof, FIG. 18 and the following discussion are intended to provide a brief, general description of a suitable environment 1800 in which the various aspects of the innovation can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The DMH 1800 (similar to handset 416) includes a processor 1802 for controlling and processing all onboard operations and functions. A memory 1804 interfaces to the processor 1802 for storage of data and one or more applications 1806 (e.g., a video player software, user feedback component software, etc.). Other applications can include voice recognition of predetermined voice commands that facilitate initiation of the user feedback signal, as well as those described infra. The applications 1806 can be stored in the memory 1804 and/or in a firmware 1808, and executed by the processor 1802 from either or both the memory 1804 or/and the firmware 1808. The firmware 1808 can also store startup code for execution in initializing the DMH 1800. A communication component 1810 interfaces to the processor 1802 to facilitate wired/wireless communication with external systems, e.g., cellular networks, VoIP networks, and so on. Here, the communications component 1810 also includes a GSM transceiver 1811 and a WiFi transceiver 1813 for corresponding signal communications. The DMH 1800 can be a device such as a cellular telephone, a PDA with mobile communications capabilities, and messaging-centric devices.

The DMH 1800 includes a display 1812 for displaying text, images, video, telephony functions (e.g., a Caller ID function), setup functions, and for user input. The display 1812 can also accommodate the presentation of multimedia content. A serial I/O interface 1814 is provided in communication with the processor 1802 to facilitate wired and/or wireless serial communications (e.g., USB, and/or IEEE 1394) via a hardwire connection, and other serial input devices (e.g., a keyboard, keypad, and mouse). This supports updating and troubleshooting the DMH 1800, for example. Audio capabilities are provided with an audio I/O component 1816, which can include a speaker for the output of audio signals related to, for example, indication that the user pressed the proper key or key combination to initiate the user feedback signal. The audio I/O component 1816 also facilitates the input of audio signals via a microphone to record data and/or telephony voice data, and for inputting voice signals for telephone conversations.

The DMH 1800 includes a slot interface 1818 for accommodating a SIC (Subscriber Identity Component) in the form factor of a card Subscriber Identity Module (SIM) 1820, and interfacing the SIM card 1820 with the processor 1802. However, it is to be appreciated that the SIM card 1820 can be manufactured into the DMH 1800, and updated by downloading data and software thereinto.

The DMH 1800 can process IP data traffic via the communication component 1810 to accommodate IP traffic from an IP network such as, for example, the Internet, a corporate intranet, a home network, a person area network, etc., via an ISP or broadband cable provider. Thus, VoIP traffic can be utilized by the DMH 1800 and IP-based multimedia content can be received in either an encoded or decoded format.

A video processing component 1822 (e.g., a camera) can be provided for decoding encoded multimedia content. The DMH 1800 also includes a power source 1824 in the form of batteries and/or an AC power subsystem, which power source 1824 can interface to an external power system or charging equipment (not shown) via a power I/O component 1826.

The DMH 1800 can also include a video component 1830 for processing video content received and, for recording and transmitting video content. A location tracking component 1832 facilitates geographically locating the DMH 1800. As described hereinabove, this can occur when the user initiates the feedback signal automatically or manually. A user input component 1834 facilitates the user initiating the quality feedback signal. The input component can include such conventional input device technologies such as a keypad, keyboard, mouse, stylus pen, and touch screen, for example.

Referring again to the applications 1806, a hysteresis component 1836 facilitates the analysis and processing of hysteresis data, which is utilized to determine if to associate with the IAP. A software trigger component 1838 can be provided that facilitates triggering of the hysteresis component 1838 when the WiFi transceiver 1813 detects the beacon of the IAP. In an active mode, the DMH GSM/WiFi handset 1800 can be equipped with the following functionality. A SIP client 1840 enables the DMH 1800 to support SIP protocols and register the subscriber with the SIP registrar server.

The DMH 1800, as indicated supra related to the communications component 1810 includes an indoor network radio transceiver 1813 (e.g., WiFi transceiver). This function supports the indoor radio link, such as IEEE 802.11, for the dual-mode GSM handset 1800.

Figure 19:
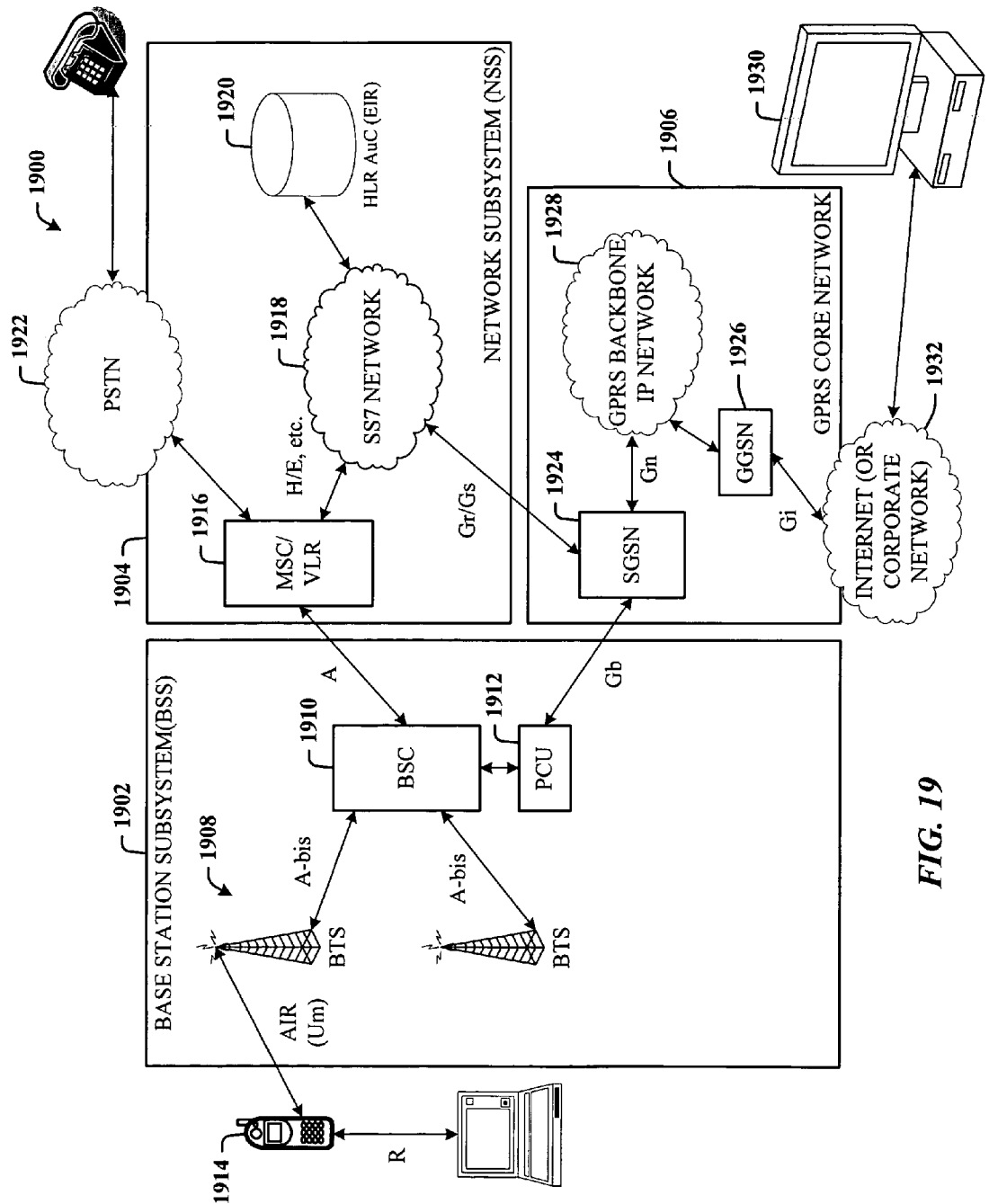
FIG. 19 illustrates an exemplary GSM network that facilitates call redirection according to an innovative aspect.

FIG. 19 illustrates an exemplary GSM network 1900 that facilitates call redirection according to an innovative aspect. The GSM system, designed as a 2G cellular communications system, utilizes TDMA (time division multiple access) technology to enable greater call capacity. Digitally-encoded speech can also be ciphered to retain call privacy. Voice calls are the primary function of the GSM system. To achieve this, the speech is digitally encoded, and later decoded using a vocoder.

GSM also supports a variety of other data services, although the performance for such data services (e.g., facsimile videotext and teletext) is slow. One data service includes SMS that allows bi-directional messaging, store-and-forward delivery, and alphanumeric messages. The overall system definition for GSM describes not only the air interface, but also the network. GSM uses 200 KHz RF channels, and are typically multiplexed to, for example, enable eight users to access each carrier.

The GSM network 1900 includes a base station subsystem (BSS) 1902, a network subsystem (NSS) 1904 and a GPRS core network 1906. The BSS 1902 can include one or more base transceiver stations (BTS) 1908 and a base station controller (BSC) 1910 connected together on an A-bis interface. The BTS and accompanying base stations (not shown) connect a cell phone to a cellular network. Base stations are all interconnected to facilitate roaming from one cell to another via a process called handover, without losing the cell connection.

A packet control unit (PCU) 1912 is shown connected to the BTS 1910 although the exact position of this can depend on the vendor architecture. The BSS 1902 is connected by the air interface Um to a mobile terminal 1914. The BTS 1908 are the actual transmitters and receivers of radio signals. Typically, a BTS for anything other than a picocell will have several different transceivers (TRXs) which allow it to serve several different frequencies or even several different cells (in the case of sectorized base stations).

By using directional antennae on a base station, each pointing in different directions, it is possible to sectorise the base station so that several different cells are served from the same location. This increases the traffic capacity of the base station (each frequency can carry eight voice channels) while not greatly increasing the interference caused to neighboring cells (in any given direction, only a small number of frequencies are being broadcast).

The BSC 1910 provides the intelligence behind the BTS 1908. Typically, a BSC can have tens or even hundreds of BTSs 1908 under its control. The BSC 1910 handles allocation of radio channels, receives measurements from the mobile phones, and controls handovers from BTS to BTS (except in the case of an inter-MSC handover in which case control is in part the responsibility of the an MSC). One function of the BSC 1910 is to act as a concentrator such that many different low capacity connections to the BTS 1908 can become reduced to a smaller number of connections towards the MSC. Generally, this means that networks are often structured to have many BSCs 1910 distributed into regions near the BTS 1908 which are then connected to large centralized MSC sites.

The PCU 1912 can perform some of the equivalent tasks of the BSC 1910. The allocation of channels between voice and data can be controlled by the base station, but once a channel is allocated to the PCU 1912, the PCU 1912 takes full control over that channel. The PCU 1912 can be built into the base station, built into the BSC, or even in some architectures, it can be at an SGSN site.

The BSS 1902 connects to the NSS 1904 by an A interface. The NSS 1904 is shown containing an MSC 1916 connected via an SS7 network 1918 to an HLR 1920. The AuC and the EIR, although technically separate functions from the HLR 1920, are shown together since combining them can be performed in the network.

The combination of a cell phone 1914 and a SIM card (not shown) creates a special digital "signature" that includes a subscriber number which is sent from the cell phone 1914 to the nearest BTS 1908 asking that the subscriber of a particular network be allowed to use the network. The request is passed on along the network of BTS 1908 to the heart of a cellular network, the MSC 1916. The MSC also routes all incoming and outgoing calls to and from the fixed-line networks or other cellular networks. When the user wants to make an outgoing call, another section of the MSC called the VLR checks whether the caller is actually allowed to make that call.

For example, if the caller is barred for international dialing, a message to that effect will be generated by the VLR, sent along the network, and almost instantly back to the cell phone.

The MSC 1916 also contains the component called HLR 1920 that provides the administrative information required to authenticate, register and locate the caller as that network's subscriber. Once the HLR has received a log-on request, the HLR 1920 immediately checks the special "signature" contained in the request against the HLR special subscriber database. If the subscription is current, the MSC 1916 sends a message back to the phone via the network of BTS 1908 that indicates the caller is allowed to access the network. The name or code of that network will appear on the LCD screen of the cell phone 1914. Once this network "name" message appears on the phone LCD screen, it means the caller is connected to the network and able to make and receive calls.

The HLR 1920 registers which base station the cell phone is currently connected to, so that when the network MSC 1916 needs to route an incoming call to the cell phone number, it will first check the H-LR 1920 to see where the cell phone is located. Periodically, the cell phone will send a message to the network indicating where it is, in a process called polling. The combination of the tracking function and the caller's unique digital signature allows the MSC 1916 to route that call to the precise base station the cell phone happens to be connected to, and then exclusively to the cell phone, even if a number of other subscribers are simultaneously connected to that base station.

When traveling to another cell while driving, for example, the HLR 1920 is automatically updated, and continues to monitor where exactly it should route the calls should the caller then move within range of another base station. This routing procedure means that out of hundreds of thousands of subscribers, only the correct cell phone will ring when necessary.

The NSS 1904 has a direct connection to the PSTN 1922 from the MSC 1916. There is also a connection to from the NSS 1904 to the GPRS core network 1906 via a Gr/Gs interface although this is optional and not always implemented. The illustrated GPRS Core Network 1906 is simplified to include a SGSN 1924 (connected to the BSS 1902 by the Gb interface) and a GGSN 1926. The SGSN 1924 and the GGSN 1926 are connected together by a private IP network 1928 called a GPRS backbone shown as the Gn reference point. A computer 1930 is depicted as connecting to the core network 1906 via an Internet or corporate network 1932.

Some voice mail systems are linked to a network SMS Center (SMSC), a special facility that handles short messages. The SMSC generates the special SMS message that notifies the caller when they have mail waiting in a Mailbox. SMS messages can be received on an SMS-capable cell phone even while the caller is on a voice call. This is because the SMS messages are sent on a different radio frequency, the GSM data channel, than voice calls, so that the two never interfere.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory to store executable instructions; and
a processor, coupled to the memory, that facilitates execution of the executable instructions to perform operations, comprising:
detecting whether a dual mode wireless device is located within an 802.11 wireless coverage area of an 802.11 network utilizing a global system for mobile communications wireless interface;
in response to detecting that the dual mode wireless device is located within the 802.11 wireless coverage area, sending, via a plain old telephone system interface, a session initiation protocol message directed to a voice-over-internet protocol system for initiating power up of an 802.11 transceiver of the dual mode wireless device, wherein the voice-over-internet protocol system is coupled to a network device of a global system for mobile communications network;
in response to receiving a communication from the voice-over-internet protocol system based on the session initiation protocol message, initiating the power up of the 802.11 transceiver;
in response to the initiating of the power up of the 802.11 transceiver, receiving, from the dual mode wireless device via an 802.11 based wireless communication, information associated with a subscription of a voice-over-internet protocol service associated with the voice-over internet protocol system, based on another communication that has been registered with an internet protocol multimedia system service device by the voice-over internet protocol system, forwarded from the voice-over internet protocol system to an access point device of the 802.11 network, and routed between the voice-over internet protocol system and a home public land mobile network device.

2. The system of claim 1, wherein the system comprises a wireless access point device.

3. The system of claim 2, wherein the wireless access point device is inside an enclosed building.

4. The system of claim 1, wherein the operations further comprise:
receiving call information redirected from the network device of the global system for mobile communications network.

5. The system of claim 1, wherein the initiating of the power up comprises initiating the power up of the 802.11 transceiver utilizing a wireless beacon signal.

6. The system of claim 1, wherein the operations further comprise:
generating signal strength information associated with the dual mode wireless device.

7. A mobile handset, comprising:
a memory to store instructions; and
a processor, coupled to the memory, that facilitates execution of the instructions to perform operations, comprising:
receiving, based on a session initiation protocol message communicated between an access point device of an 802.11 network and a voice-over-internet protocol device coupled to a global system for mobile communications network, a wireless signal according to a detection, via a global system for mobile communications wireless interface, of the mobile handset within a location of an 802.11 wireless coverage area of the 802.11 network, and according to a reception, via a plain old telephone system interface, of a session initiation protocol message by a network device of the global system for mobile communications network;

in response to the receiving of the wireless signal, powering up an 802.11 transceiver of the mobile handset; and sending, via an 802.11 based wireless communication utilizing the 802.11 transceiver, data associated with a subscription of a voice-over-internet protocol service directed to the voice-over-internet protocol device, based on a communication that is registered by the voice-over internet protocol device with an internet protocol multimedia system service device, forwarded from the voice-over internet protocol device to the access point device, and routed between the voice-over internet protocol device and a home public land mobile network device.

8. The mobile handset of claim 7, wherein the operations further comprise: receiving a voice communication associated with a call that is transferred between a network device of the global system for mobile communications network and the access point device of the 802.11 network.

9. The mobile handset of claim 7, wherein the sending of the data comprises initiating a location update procedure with a network device of the global system for mobile communications network.

10. The mobile handset of claim 7, wherein the operations further comprise: receiving signal strength information from the access point device of the 802.11 network; and in response to determining that the signal strength information satisfies a predefined condition with respect to a predetermined level of the signal strength information, initiating a registration with a network device of the global system for mobile communications network.

11. The mobile handset of claim 10, wherein the operations further comprise:

initiating a global system for mobile communications location update procedure in response to the determining.

12. The mobile handset of claim 10, wherein the registration is associated with a transfer of internet protocol-based information.

13. The mobile handset of claim 10, wherein the registration is associated with a short message service message.

14. A method, comprising:

determining, by a voice-over-internet protocol system including a processor using a global system for mobile communications wireless interface, that a location of a mobile handset corresponds to an 802.11 network, wherein the voice-over-internet protocol system is coupled to a device of a global system for mobile communications network;

receiving, by the voice-over-internet protocol system via a plain old telephone system connection, a session initiation protocol message from an access point device of the 802.11 network for initiating power up of an 802.11 transceiver of the mobile handset;

in response to the receiving of the session initiation protocol message, sending, by the voice-over-internet protocol system, a first communication directed to the access point device for the initiating of the power up of the 802.11 transceiver of the mobile handset; and in response to the initiating of the power of the 802.11 transceiver of the mobile handset, receiving, by the voice-over-internet protocol system via an 802.11 based wireless communication, information associated with a subscription of a voice-over-internet protocol service from the mobile handset, routing, by the voice-over-internet protocol system, a second communication directed to a home public land mobile network device, registering, by the voice-over-internet protocol system, the second communication with an internet protocol multimedia system service device, and forwarding, by the voice-over-internet protocol system, the second communication to the access point device.

15. The method of claim 14, further comprising: initiating, by the voice-over-internet protocol system, an activation of the 802.11 transceiver via a broadband connection.

16. The method of claim 14, further comprising:

registering, by the voice-over-internet protocol system, the second communication with the device of the global system for mobile communications network.

17. The method of claim 14, further comprising: redirecting, by the voice-over-internet protocol system, a second communication from the access point device to the device of the global system for mobile communications network in response determining that the location of the mobile handset does not correspond to the 802.11 network.

18. The method of claim 14, further comprising: transferring, by the voice-over-internet protocol system, a second communication from the device of the global system for mobile communications network to the access point device in response to determining that the location of the mobile handset corresponds to the 802.11 network.

* * * * *